(12) United States Patent
Walker

(10) Patent No.: US 9,716,778 B1
(45) Date of Patent: Jul. 25, 2017

(54) THREE DIMENSIONAL EXTENSION-SCREEN SMART PHONE

(71) Applicant: Derrick Kingsley Walker, Snellville, GA (US)

(72) Inventor: Derrick Kingsley Walker, Snellville, GA (US)

( * ) Notice: Subject to any disclaimer, the term of this patent is extended or adjusted under 35 U.S.C. 154(b) by 0 days.

(21) Appl. No.: 15/139,515

(22) Filed: Apr. 27, 2016

Related U.S. Application Data

(60) Provisional application No. 62/179,092, filed on Apr. 27, 2015.

(51) Int. Cl.
*H04M 1/02* (2006.01)
*H04B 1/38* (2015.01)

(52) U.S. Cl.
CPC ....... *H04M 1/0235* (2013.01); *H04M 1/0247* (2013.01); *H04M 1/0266* (2013.01); *H04M 2250/16* (2013.01)

(58) Field of Classification Search
CPC .... H04M 1/02; H04M 1/0235; H04M 1/0247; H04M 1/0266; H04M 1/026; H04M 1/0268
See application file for complete search history.

(56) References Cited

U.S. PATENT DOCUMENTS

| | | | | |
|---|---|---|---|---|
| 8,605,421 | B2* | 12/2013 | Verschoor | G06F 1/1652 361/679.21 |
| 9,013,864 | B2* | 4/2015 | Griffin | H04M 1/0216 16/382 |
| 9,063,592 | B2* | 6/2015 | Kim | G02F 1/13306 |
| 9,071,673 | B2* | 6/2015 | Choi | H04M 1/0216 |
| 9,232,044 | B2* | 1/2016 | Park | H04M 1/72583 |
| 9,383,886 | B2* | 7/2016 | Lee | H04M 1/72522 |
| 2014/0194165 | A1* | 7/2014 | Hwang | G06F 1/1677 455/566 |
| 2014/0213324 | A1* | 7/2014 | Tan | H04M 1/0268 455/566 |
| 2015/0227286 | A1* | 8/2015 | Kang | H04M 1/0245 715/781 |
| 2016/0191690 | A1* | 6/2016 | Park | H04M 1/72519 455/566 |
| 2017/0099070 | A1* | 4/2017 | Piccionelli | H04B 1/385 |

FOREIGN PATENT DOCUMENTS

JP  WO 03056786 A1 * 7/2003 ......... H04M 1/0233

* cited by examiner

*Primary Examiner* — Blane Jackson
(74) *Attorney, Agent, or Firm* — John D. Gugliotta

(57) ABSTRACT

A versatile multiple display screen smart-phone, having configuration of retractable dual extension screen unites assembled at either side of device, whereby retracted extension screens can be extracted from a prefabricated interior twofold passageway/storage unit for added multi-tasking convenience and/or combined consolidation with main display screen for display screen enlargement.

8 Claims, 25 Drawing Sheets

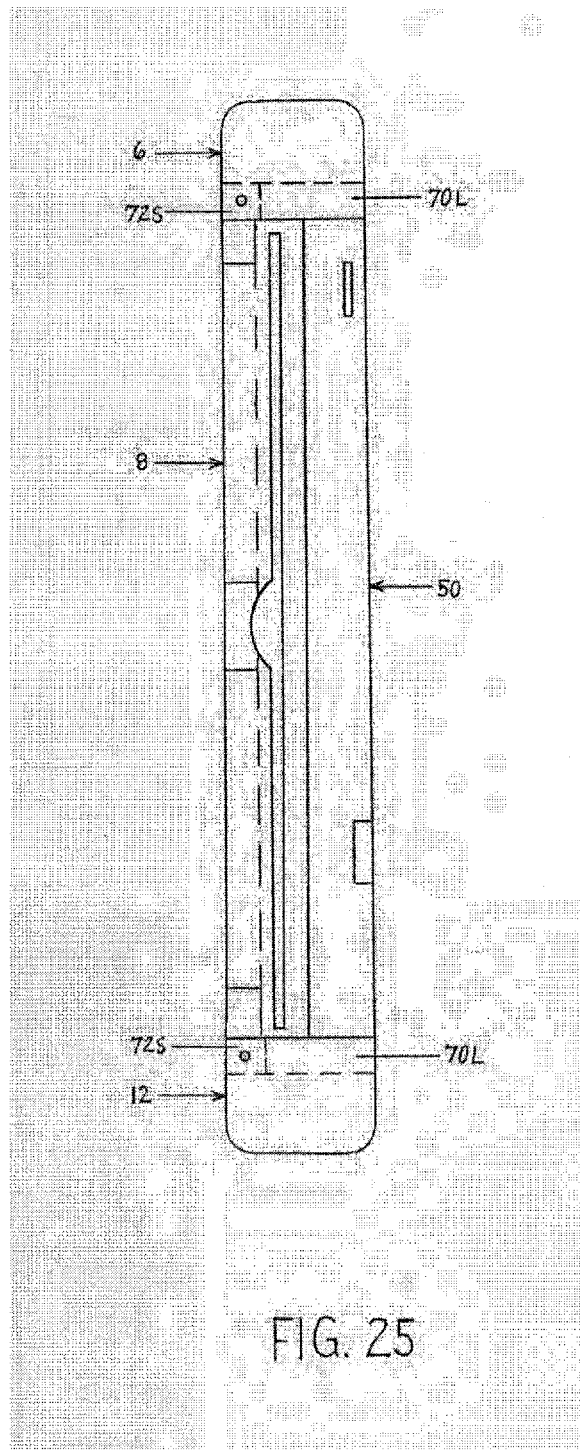

THREE DIMENSIONAL EXTENSION-SCREEN SMART PHONE

RELATED APPLICATIONS

The present application claims benefit of U.S. Provisional Patent 62/179,092, filed on Apr. 27, 2015 and incorporated by reference as if fully rewritten herein.

BACKGROUND OF THE INVENTION

1. Field of the Invention

The present invention relates generally to smart (i.e. internet enabled) cellular phones and, particularly, to a smart phone featuring three display screens to allow interface with wireless data communication.

2. Description of the Related Art

Unique mobile handset smart phones, such as the Galaxy S6 Edge, LG V10, LGX Screen and TotaPhone 2, are known in the art of cell phone technology for their styling designs and advanced feature offerings including, inter alia, dual screens, second screens options, improved camera functions, and other performance qualities.

These and other smart phones and similar electronics are overwhelmingly useful for wireless communication in conducting personal business affairs and other matters of importance in today's world of high-tech social media. However, such devices do not resolve smart phone users' constant demands for a compatible smart phone against today's leading tablet devices having larger display screens without compromising the devices' compactness.

Thus, a need exists for a more versatile smart phone to satisfy electronic consumer's ultimate demands phone larger display screens without compromising attractive and compact design.

SUMMARY OF THE INVENTION

The present invention provides a three dimensional extension screen smart phone comprising five sectional interconnected prefabrication and following functional units including" a central data processor; a memory unit; a display element having multiple user interfaces; a power supply unit; and a wireless transceiver configured for wireless data communication using the frequency ranges of the sub GHz frequency band for sending and receiving data. Each of the functional units are functionally connected to at least the central data processing unit.

Further features of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 25 is an overall perspective view of FIG. 1, showing joint assemblage embodiment of FIG. 22C with attached top and bottom sectional cap prefabrications of FIGS. 4A and 4B.

DRAWING REFERENCE NUMERALS

Figure 1:
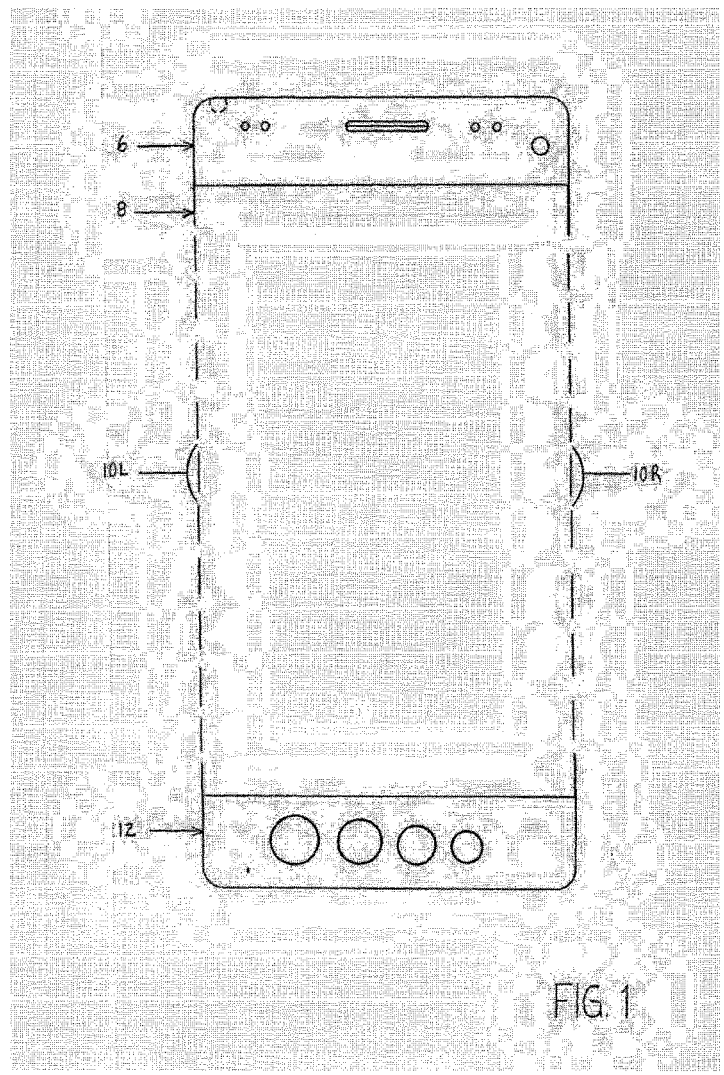
FIG. 1 is an assembled front view of a three dimensional extension screen smart phone according to the preferred embodiment of the present invention.

6 Top cap sectional prefabrication
8 display screen middle section prefabrication
10 left/right circular extension screen fingertip grips
12 bottom cap sectional prefabrication
14 earplug jack
16 left/right extension screen motion sensors
18 speaker
20 proximity sensor
22 gesture sensor
24 front camera lens
26 left/right assembly cavities
28 top/bottom assembly pegs
30 micro screw assembly holes
32 display screen prefabrication interlock ridges
34 left/right display screen prefabrication middle spacings
36 display screen logic board
38 display screen logic board top/bottom male copper ribbon band connectors
40 microphone
42 menu button
44 home button
46 back button
48 search button
50 rear sectional prefabrication
52 volume control bar
54 off/on switch bar
56 rear camera lens
57 top/bottom rear frame overlaps
58 rear camera lens flash
60 battery compartment door
62 electrical power outlet
64 speaker phone speaker
66 female copper ribbon band connectors
68 inwards folding hinge
70 left/right long sleeve fasteners
72 left/right short sleeve fasteners
74 display screen prefabrication top/bottom extended framing
76 front/rear top/bottom ribbon band outlets
78 embedded copper power track connectors
80 extended framing extension top/bottom
82 rear camera lens/flash 104 attached extension display compartment enclosure screen
84 battery compartment 106 top/bottom slide track enclosure chamber
86 short/long copper ribbon band 108 slide track chambers locking line connectors mechanism snags
88 rear sectional prefabrication 110 slide track chambers twofold shell passageway and storage
90 attached monitor display compartments screen 112 slide track chamber's center
92 left/right side extension divider screen frames 114 front/rear slide track
94 top/bottom copper lined chamber's assemblage plates interlocking slots 116 assembled extension screen's
96 top/bottom flexible metallic twofold passageway and arms storage unit
98 top/bottom impressed locking 118 display screen left/right grooves frameless creased edges
100 top/bottom interlock cavities
102 extension screen logic board

DESCRIPTION OF THE PREFERRED EMBODIMENTS

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

The best mode for carrying out the invention is presented in terms of its preferred embodiment, herein depicted within the Figures.

1. Detailed Description of the Figures

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

Referring now to the drawings, wherein like reference numerals indicate the same parts throughout the several views, FIG. 1 provides a three dimensional extension screen smart phone according to the preferred embodiment of the present invention, comprising a top cap sectional prefabrication 6, a display screen middle sectional prefabrication 8, a bottom cap sectional prefabrication 12, a rear sectional prefabrication 50, and a twofold extension screen passageway/storage unit prefabrication 116.

Figure 2:
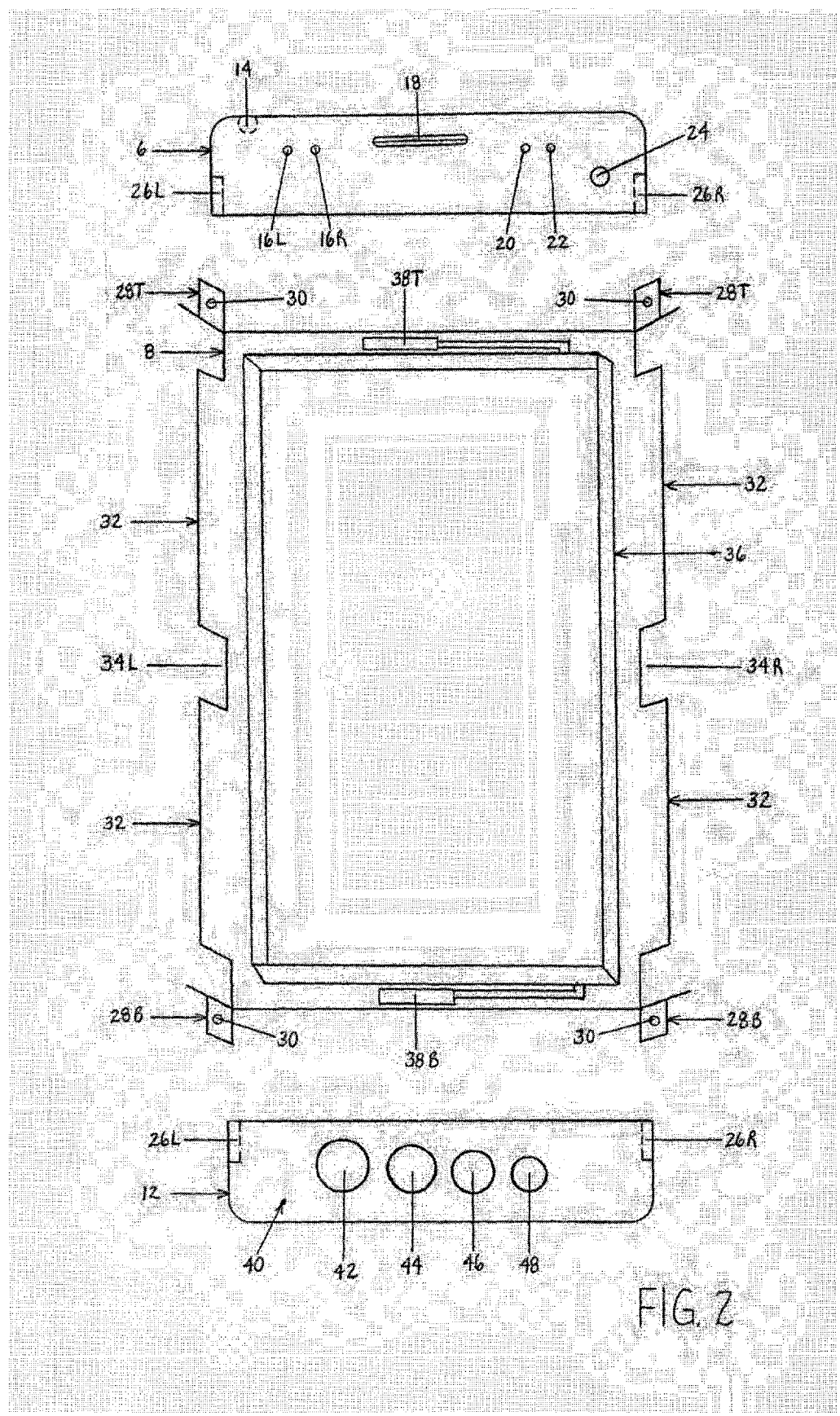
FIG. 2 is an exploded view of a top, middle and bottom sectional prefabrication of FIG. 1.

FIG. 2 provides a perspective detachment view of FIG. 1 section prefabrications. Top cap prefabrication 6 encompasses an earplug jack 14, left/right (L/R) extension screen motion sensors 16, a speaker 18, a proximity sensor 20, a gesture sensor 22, a front camera lens 24, L/R assembly cavities 26, while display screen prefabrication 8 frame structure encompass top/bottom (T/B) assembly pegs 28, micro-screw assembly holes 30, display screen prefabrication interlock ridges 32, L/R display screen prefabrication 8 middle spacings 34, a display screen logic board 36, T/B logic board male copper ribbon band connectors 38, bottom cap 12 prefabrication encompass L/R assembly cavities 26, a microphone 40, a menu button 42, a home button 44, a back button 46, and a search button 48. Top 6 and bottom cap 12 prefabrication by way of their respective assembly cavities 26 attaches to display screen prefabrication 8 T/B assembly pegs 28 for assemblage of FIG. 1. Dimensions for top 6 and bottom cap 12 prefabrication may be 2⅜ by ⅝ and ¾ inches in diameter, while dimension of the display screen prefabrication 8 framed encasement of FIG. 1 may be 2⅜ by 4½ inches.

Figure 3:
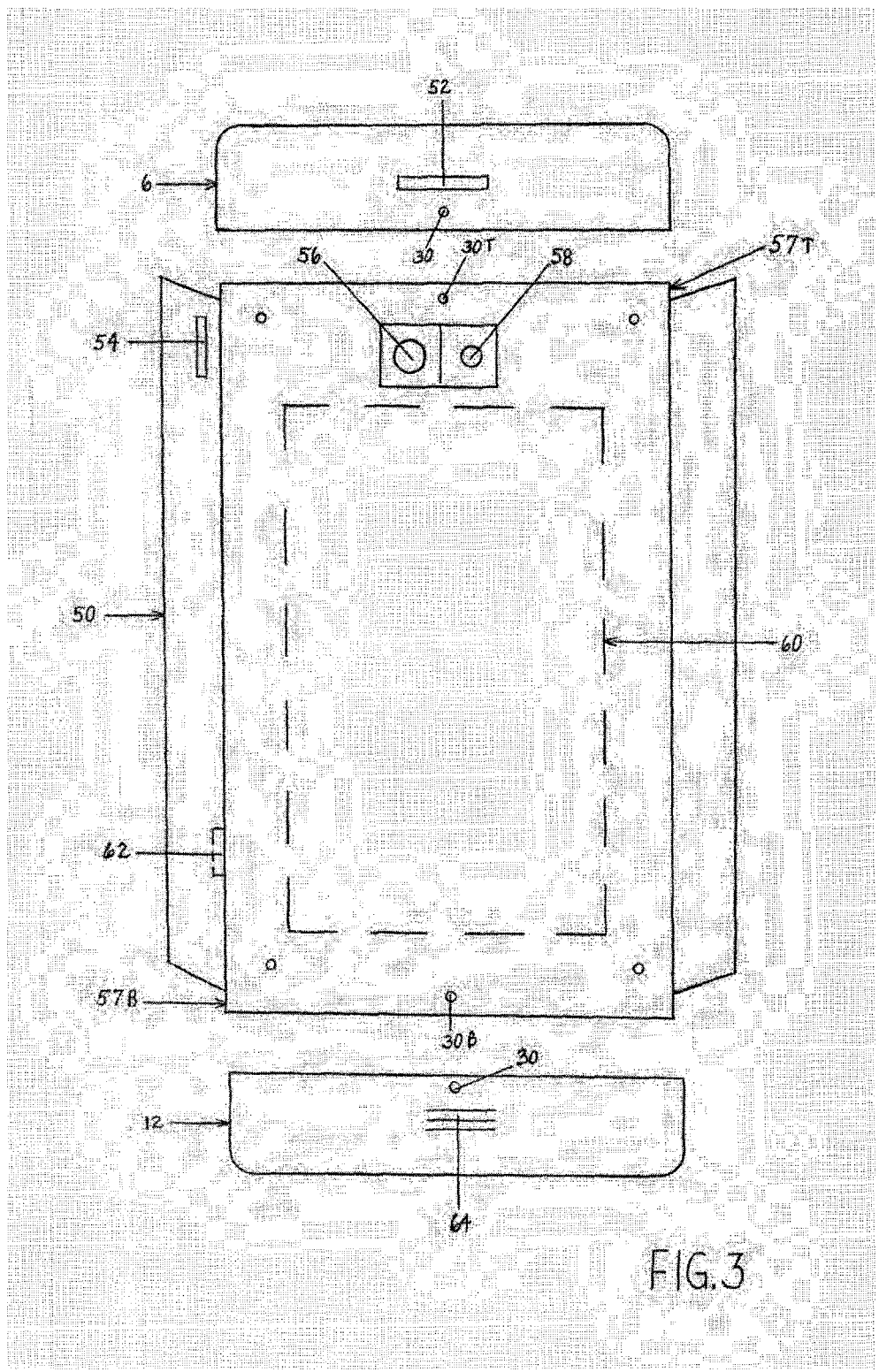
FIG. 3 is an exploded rear view of a top and bottom sectional cap prefabrication respectively of FIG. 2, and rear sectional prefabrication of FIG. 7 below.
Figure 7:
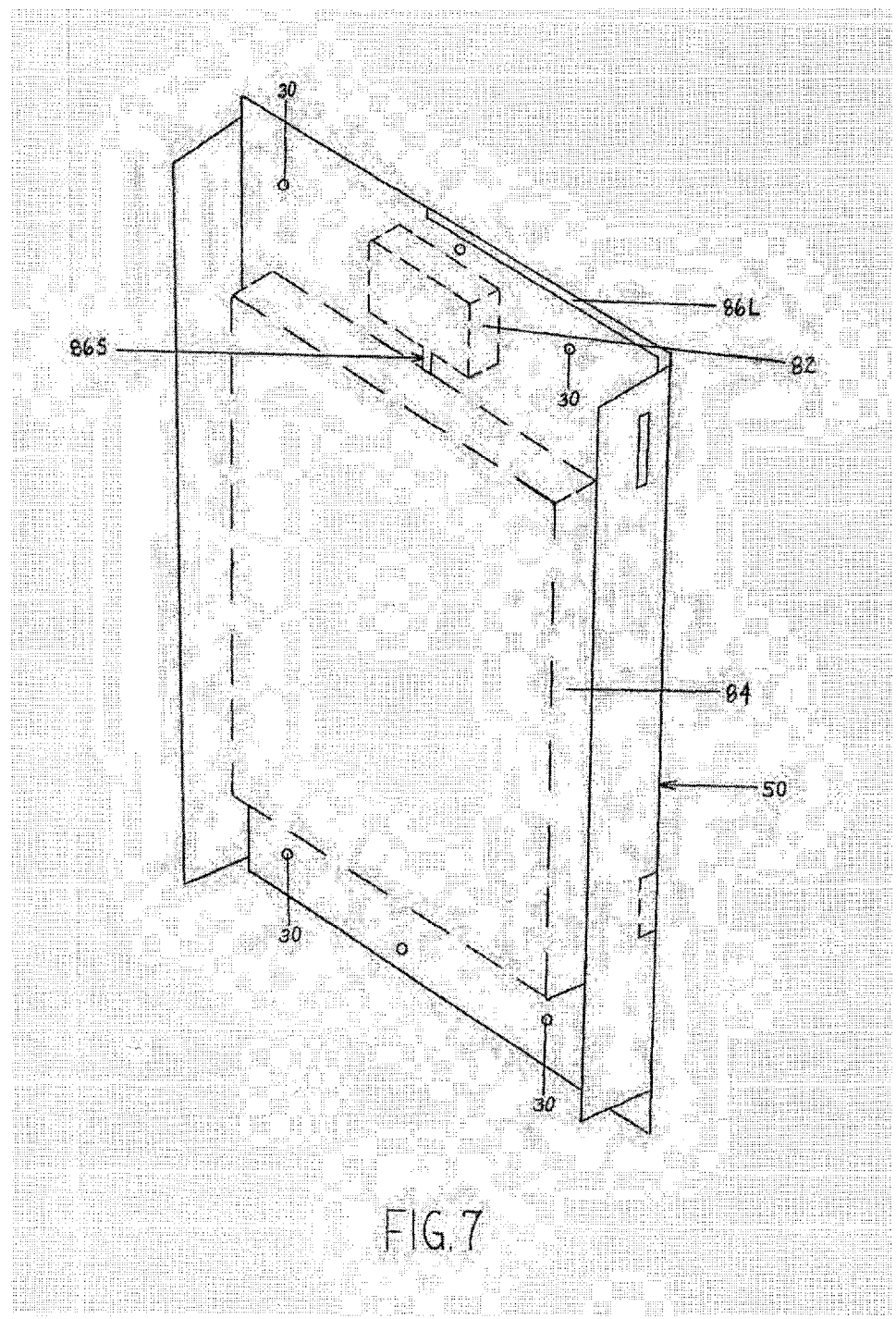
FIG. 7 is an interior view of rear sectional prefabrication of FIG. 3 showing combination camera lens/camera flash and battery compartment enclosures (broken lines) with attached ribbon band power line connector.

FIG. 3 provides a rear view detachment of top cap 6 and bottom cap 12 of FIG. 2 and rear sectional prefabrication 50 of FIG. 7 of the drawings. While top cap 6 prefabrication encompasses a conveniently located volume control bar 52 and micro-screw assembly hole 30, rear sectional prefabrication 50 encompasses an off/on switch bar 54, a camera lens 56, T/B rear frame overlaps 57, a camera lens flash 58, a battery compartment door 60 (dashed lines), an electrical power outlet 62, top and bottom center micro-screw assembly holes 30, while bottom cap prefabrication 12 encompasses a speaker phone speaker 64, and micro-screw assembly hole 30. In assemblage, top cap 6 and bottom cap 12 prefabrications' respectively micro-screw assembly holes 30 align with center micro screw assembly hole 30 of rear sectional prefabrications' 50 T/B frame overlaps 57. Dimension of rear sectional prefabrication 50 may be 2⅜ by 4½ inches and ⅜ inches in diameter.

FIG. 4 provides a perspective isolation view of top cap prefabrication 6 of FIG. 2, which encompass amongst other noted components, a female copper ribbon band connector 66 that in assemblage intercourse with top male ribbon band connector 38 of FIG. 2.

Figure 4A:
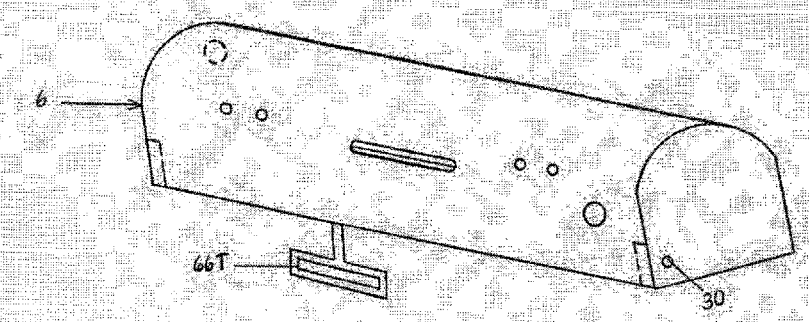
FIG. 4A is a perspective detachment view of a top sectional cap prefabrication of FIG. 1 with interior components partly visible.

FIG. 4A provides a perspective isolation view of bottom cap prefabrication 12 of FIG. 2, which encompass amongst other noted components, a female copper ribbon band connector 66 that in assemblage intercourse with bottom male band connector 38 of FIG. 2

Figure 4B:
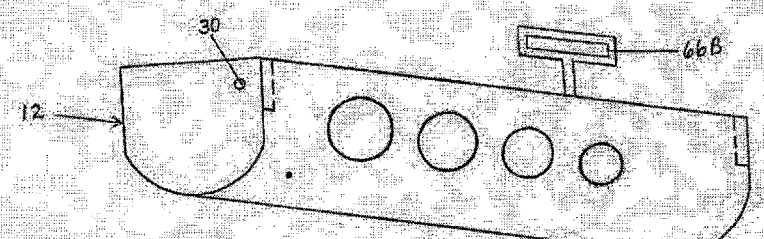
FIG. 4B is a perspective detachment view of a bottom sectional prefabrication of FIG. 1 with interior components partly visible.

FIG. 4B provides a shell view of top 6 and bottom cap 12 prefabrications respectively of FIGS. 4 and 4A, which encompass an inwards folding hinge 68 that allows open access to the components assembled inside top 6 and bottom cap 12 prefabrications of FIGS. 2, 4 and 4A.

Figure 4C:
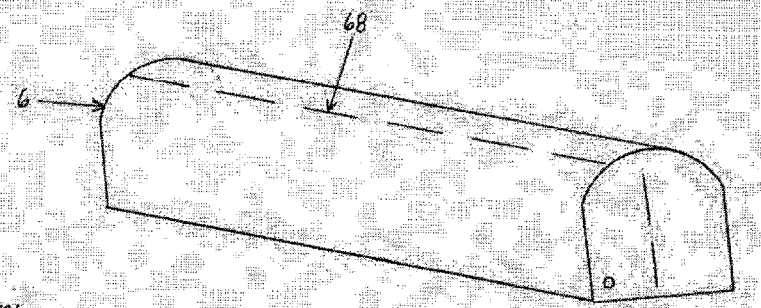
FIG. 4C is a perspective view of both top and bottom sectional prefabrications of FIG. 4A and FIG. 4B showing exterior framing.

FIG. 4C provides an exploded view of top 6 and bottom cap 12 shell prefabrication of FIG. 4B, which encompass an inwards folding hinge 68, L/R long sleeve fasteners 70, L/R short sleeve fasteners 72, and respective micro-screw assembly holes 30. Dimensions of long sleeve fasteners 70 is ¾ inches by ¼ inches, while short sleeve 72 dimensions are 5/16 inches by ¼ inches. When top 6 and bottom cap 12 shell prefabrication is in closed mode of FIG. 4B, long sleeve fasteners 70 overlaps short sleeve fasteners 72 for a level closure (as clearly shown in FIG. 25 of the drawings).

Figure 5:
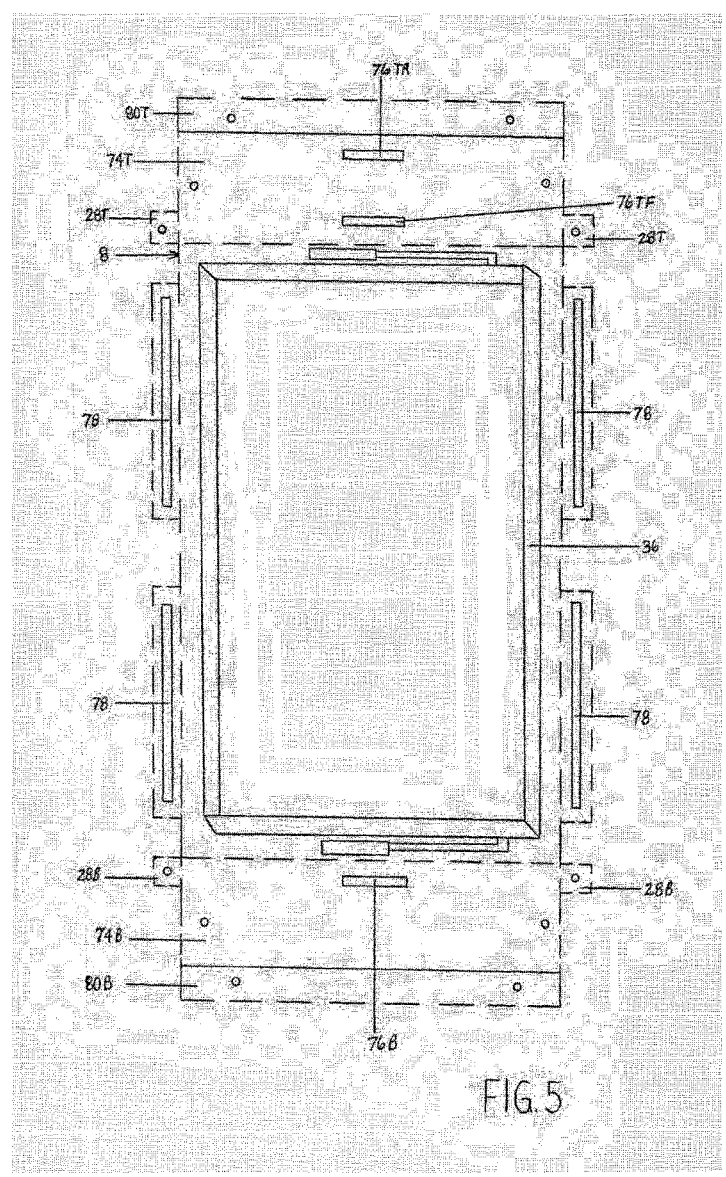
FIG. 5 is an exploded view of middle sectional prefabrication frame structure of FIG. 2, showing interior components and encased logic board.

FIG. 5 provides an exploded view of display screen middle prefabrication 8 frame structure (dashed lines) of FIG. 2, which encompass T/B extended framing 74, top front and rear ribbon band outlets 76, T/B assembly pegs 28, embedded copper power track connectors 78, T/B extended framing extensions 80, and display screen logic board 36 of FIG. 2 which dimensions are 2 7/16 by 4 3/16 inches and 3/16 inches in diameter.

Figure 6:
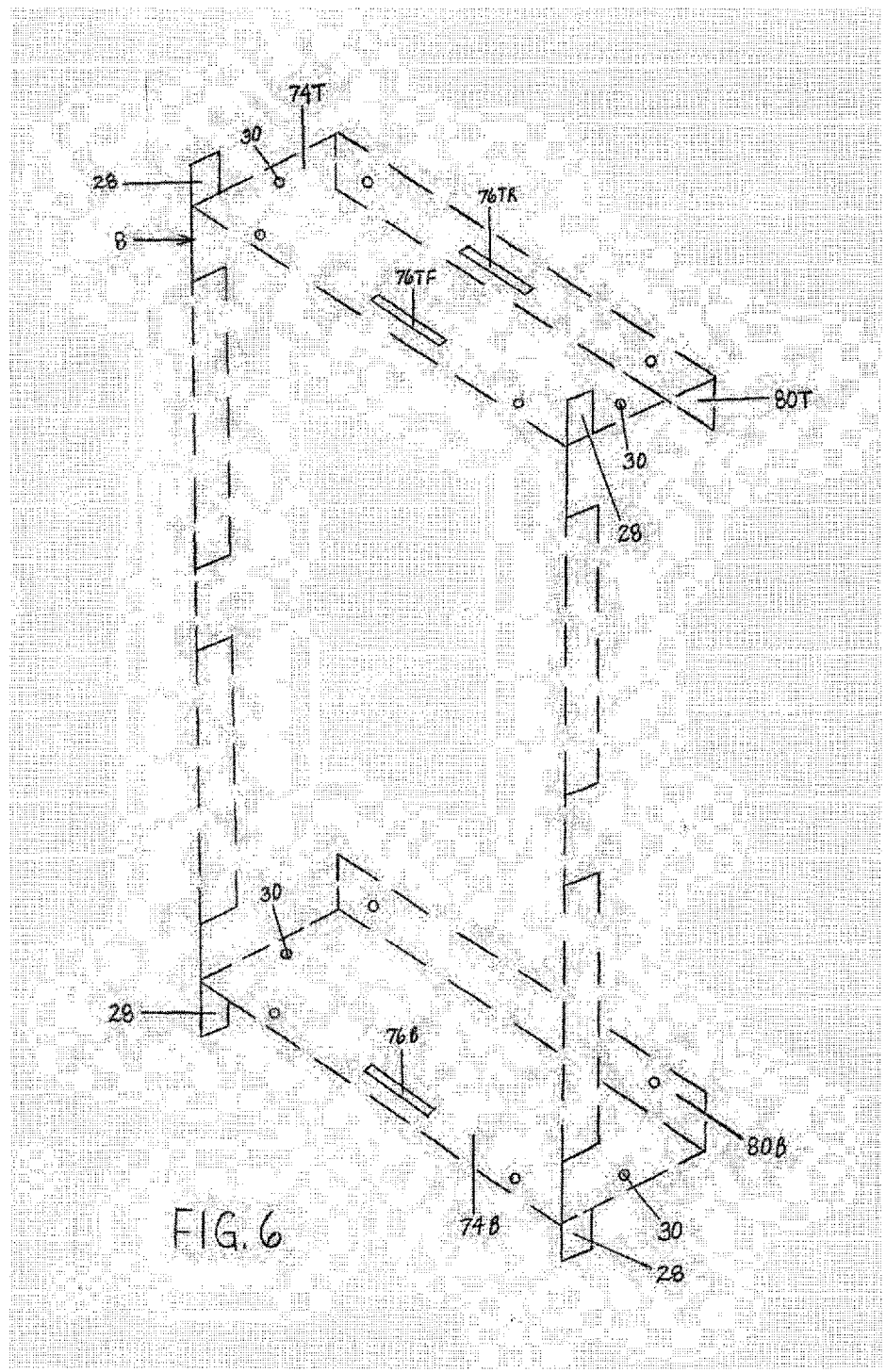
FIG. 6 is an assembled view of middle sectional prefabrication frame structure of FIG. 5, showing interconnect assemblage scenario.

FIG. 6 provides a perspective assembled view of display screen middle prefabrication 8 frame structure of FIG. 5, which encompass T/B extended framing 74 with micro-screw assembly holes 30, T/B assembly pegs 28 which dimensions are 3/16 by 3/16 and 1/16 inches thick, T/B extended framing extensions 80, top front and rear ribbon band outlets 76. In assemblage female copper ribbon band connectors 66 of FIGS. 4 and 4A respectively funnel through top front, and bottom ribbon band outlets 76 for interlockment with T/B male ribbon band connectors 38 of FIG. 2.

FIG. 7 provides an interior view of rear sectional prefabrication 50 of FIG. 3, which encompass a rear camera/flash compartment enclosure 82 (upper encased dashed lines), a battery compartment enclosure 84 (lower encased dashed lines), micro-screw assembly holes 30, short and long ribbon band line connectors 86 which in assemblage funnel through top rear ribbon band outlet 76 of FIG. 6 whereby connecting rear sectional prefabrication 50 components with power source of top cap 6 prefabrication of FIG. 4, rear sectional prefabrication 50 by way of its micro-screw assembly holes 30 attaches to back of display screen prefabrication 50 frame structure of FIG. 6

Figure 8:
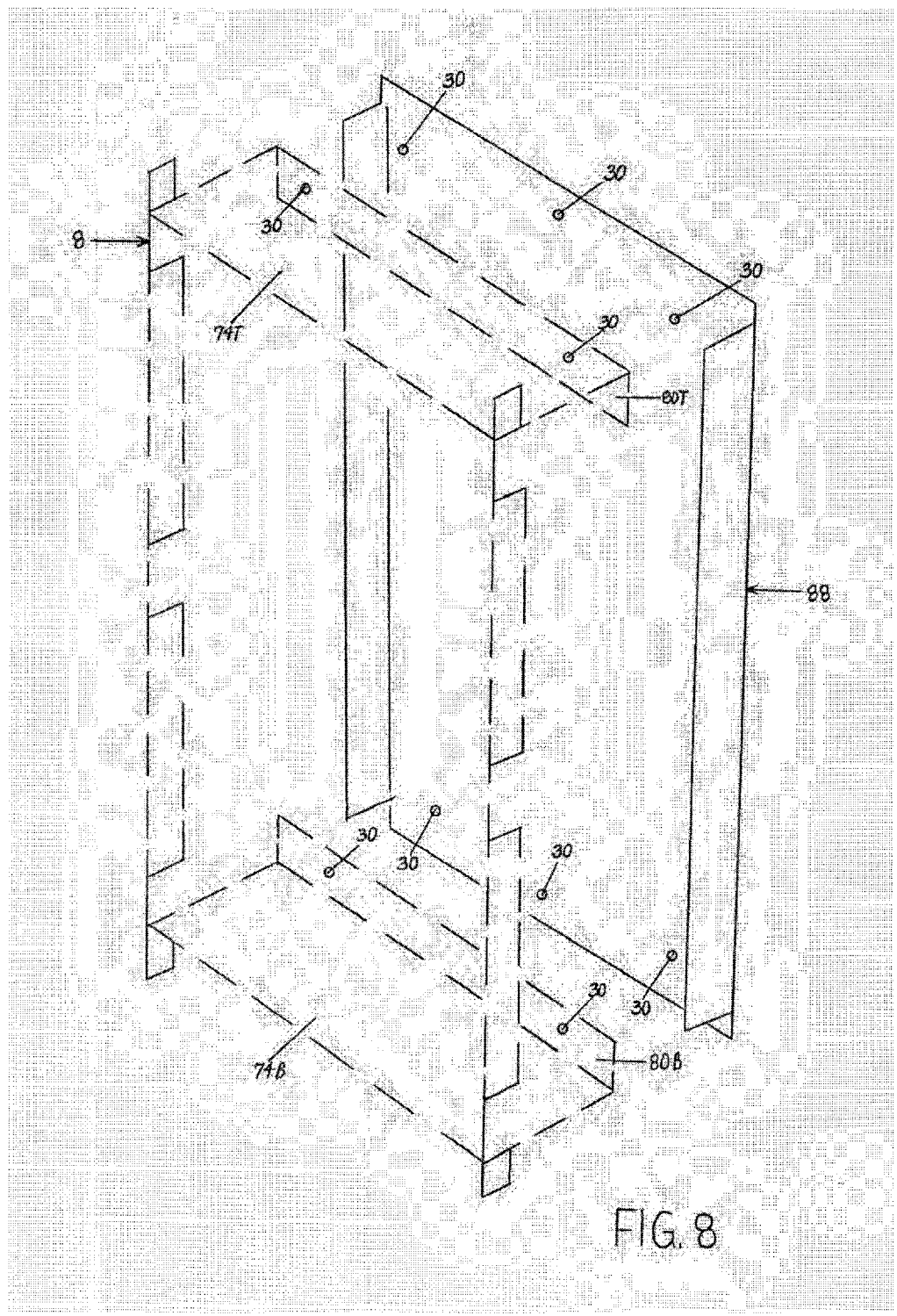
FIG. 8 is a perspective view of display screen middle sectional prefabrication of FIG. 6, and shell encasement of rear sectional prefabrication of FIG. 7, showing scenario of interconnect assemblage.

FIG. 8 provides an alignment view of display screen middle prefabrication 8 frame structure (dashed lines) of FIG. 6 and rear sectional prefabrication shell 88 (solid lines) of FIG. 7. While display screen prefabrication 8 frame structure encompass T/B extended framing 74 and T/B extended framing extensions 80 with micro-screw assembly holes 30 of FIG. 6, rear sectional prefabrication shell 88 encompass T/B micro-screw assembly holes 30 of FIG. 7. Dimensions of top/bottom extended framing 74 are 2 6/16 by ¾ inches while measurements of T/B extended framing extensions 80 are 2⁵⁄₁₆ by ¼ inches. Rear sectional prefabrication shell 88 overall dimensions are 2⁵⁄₁₆ by 4½ inches with creased side of ⅜ inches in width.

As shown in FIG. 8 and FIG. 22C, the display screen middle sectional prefabrication 8 interconnects to the rear sectional prefabrication 50 by way of each prefabrication's various assembly pegs 28, micro-screw assembly holes 30, and affixed rear frame overlaps 57. Upon joint interconnect of display screen middle sectional prefabrication 8 to that of rear sectional prefabrication 50 of FIG. 8, the entire embodiment of twofold extension screen passageway/storage unit prefabrication 116 of FIG. 18 attaches to the vast interior spacing in between top and bottom extended framings 74 of FIGS. 6 and 8 respectively, while top cap 6 and bottom cap 12 sectional prefabrications of FIGS. 4A and 4B upon interconnect with embodiment for display screen 8 and rear sectional prefabrications 50 completes the prefabricated assemblage of three-dimensional extension screen smart phone of FIG. 1 and FIG. 25.

Figure 9:
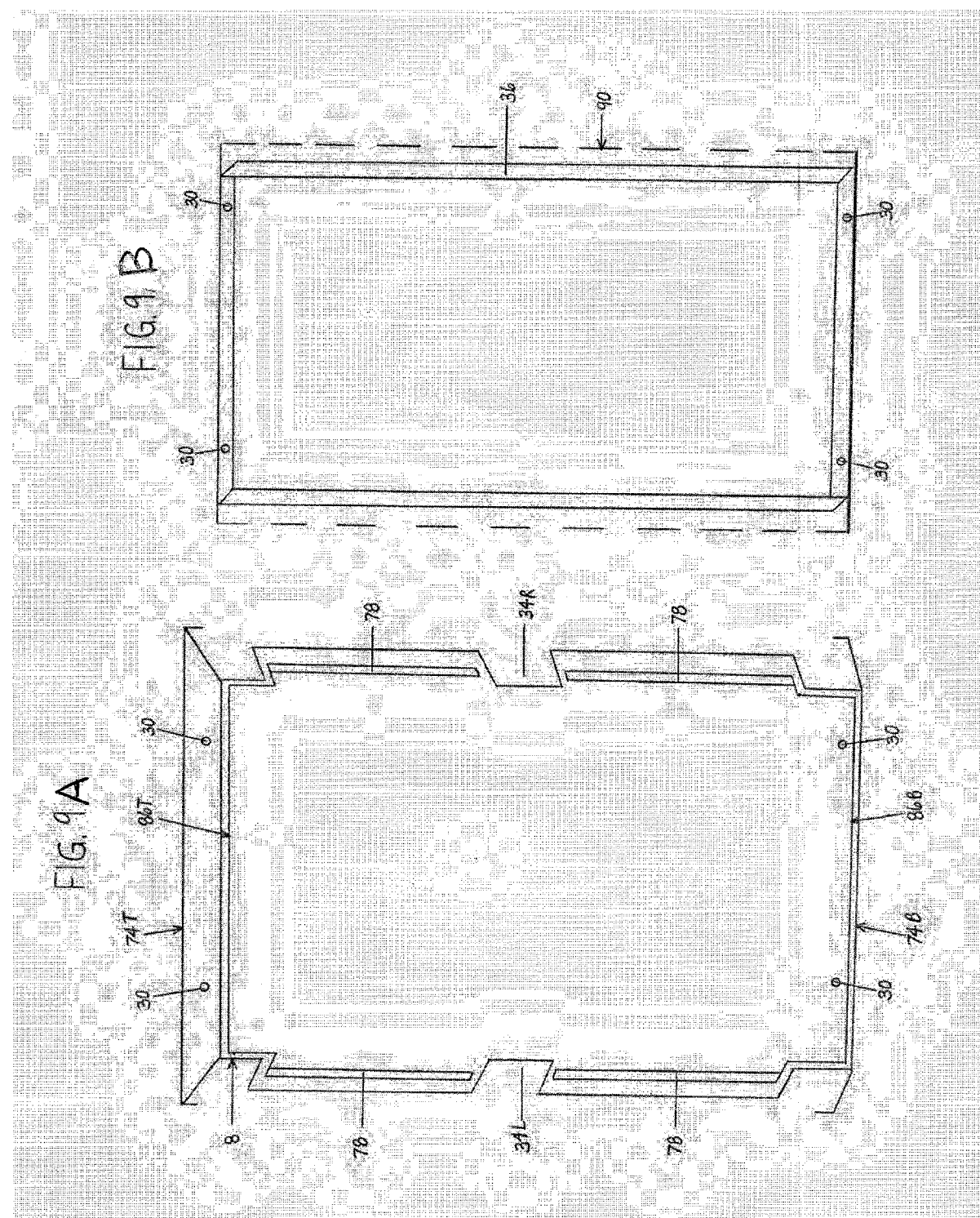
FIG. 9A is a framed view of display screens of FIGS. 1 and 2 encased in middle sectional prefabrication frame structure of FIG. 2.
FIG. 9B is a detachment front view of a logic board of middle sectional prefabrication framing of FIG. 5, with attached display screen (broken lines)

FIG. 9 provides a framed view of assembled display screen middle prefabrication 8 explosion of FIG. 5, which encompass T/B long copper ribbon band line connectors 86, embedded copper power-track connectors 78, T/B extended framing 74, T/B micro-screw assembly holes 30, left/right display screen prefabrication middle spacings 34 which dimensions are ¼ by ⁷⁄₁₆ inches. In assemblage T/B long copper ribbon band line connectors 86 by way of attachment with embedded copper power track connectors 78 (as shown in configuration) funnels through both, top front extended framing 74 ribbon band outlet 76 and bottom extended framing 74 ribbon band outlet 76 of FIG. 6 for power source connection with top 6 and bottom cap 12 prefabrications respectively of FIGS. 4 and 4A.

FIG. 9A provides a forward view of display screen logic board 36 of FIG. 5, which encompass T/B micro-screw assembly holes 30, attached monitor display screen 90 (dashed lines encasement). In assemblage logic board 36 mounts to front display screen middle prefabrication 8 frame structure of FIG. 9 by way of display screen middle prefabrication 8 frame structure affixed micro-screw assembly holes 30.

Figure 10:
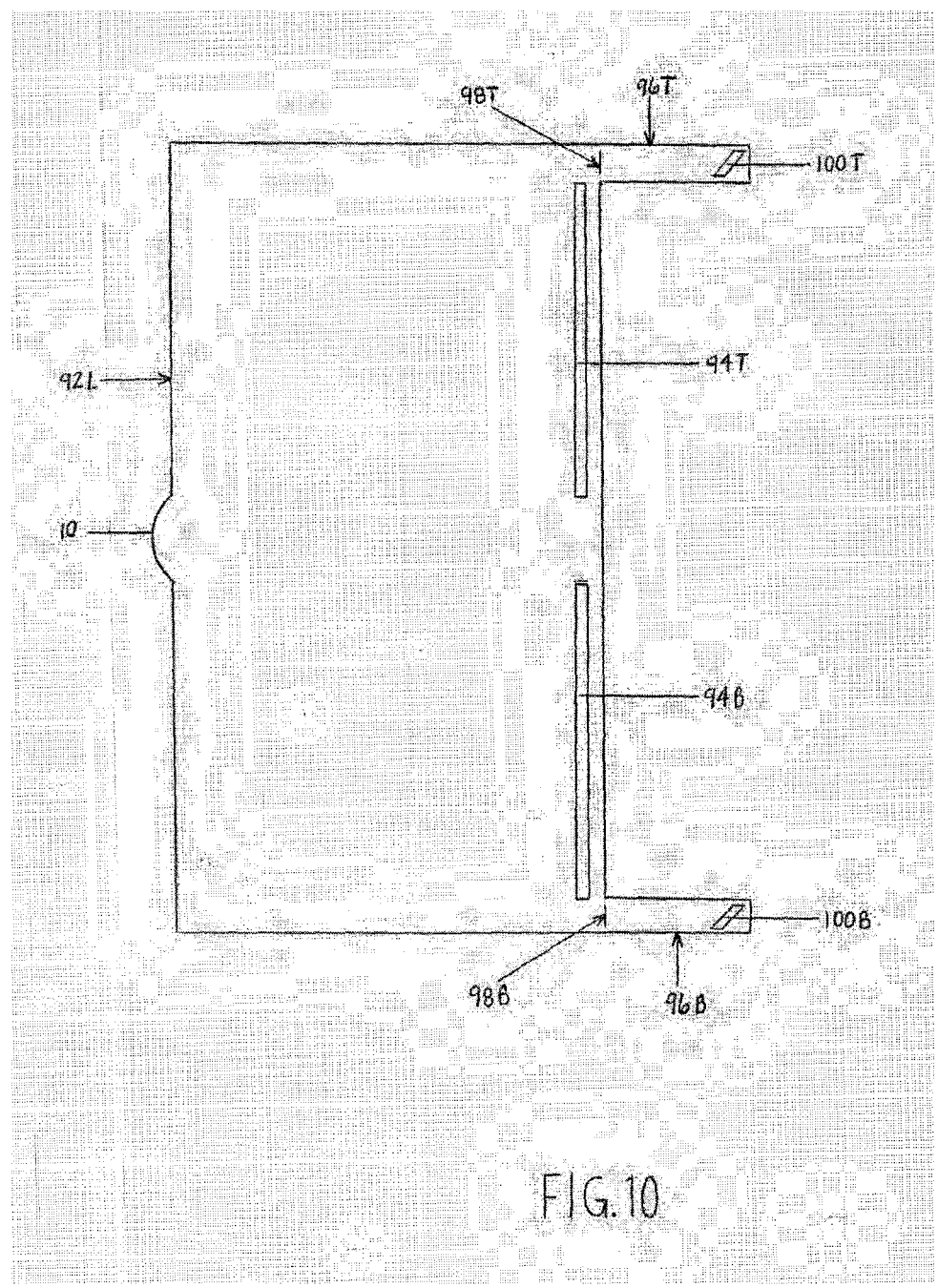
FIG. 10 is a perspective view of lefthand side extension screen frame of FIG. 19 below.
Figure 19:
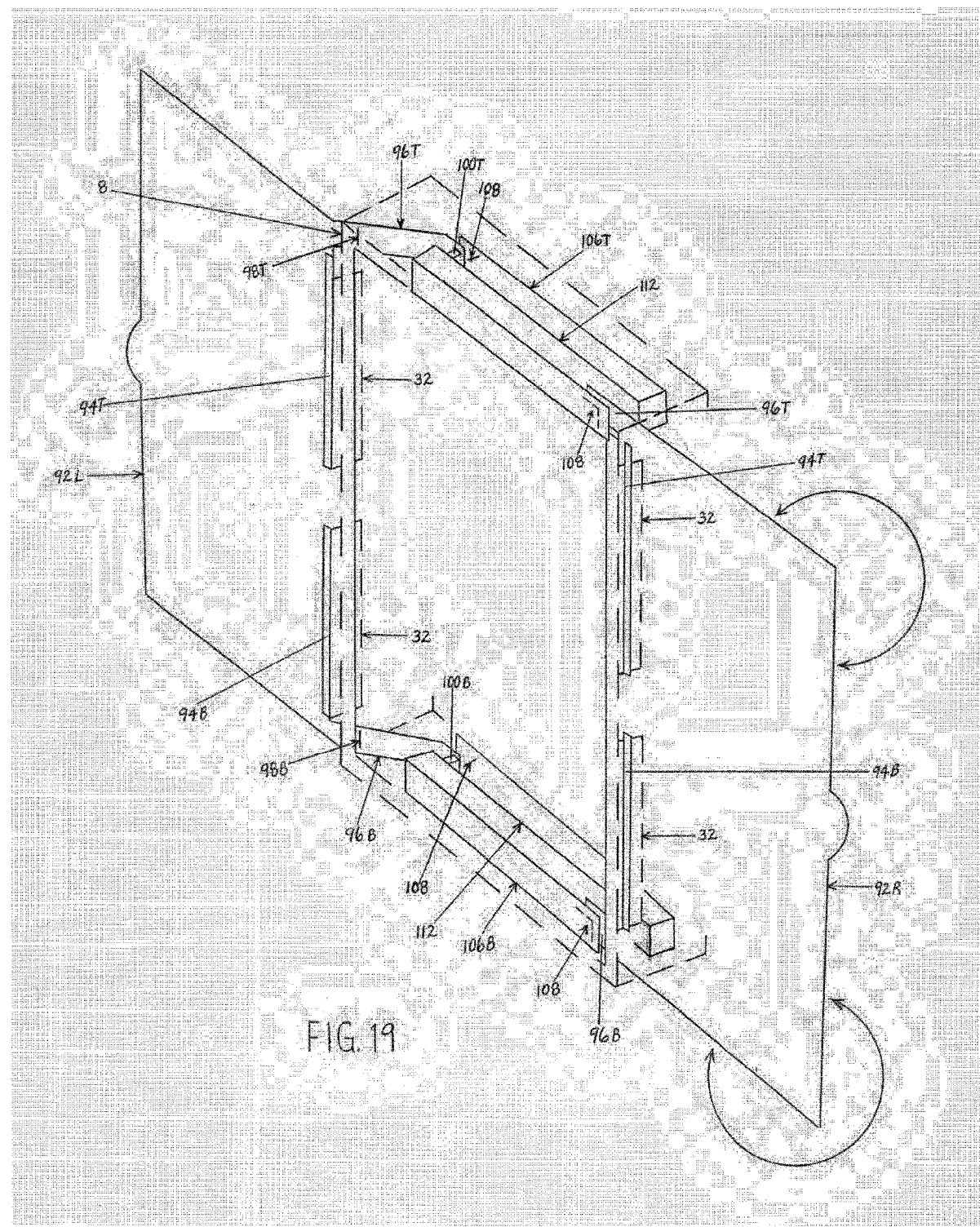
FIG. 19 is a perspective view of display screen middle sectional prefabrication frame structure of FIG. 21 below with fully extracted extension screen frames of FIGS. 10 and 11 attached inside locking mechanisms of top and bottom slide track chambers of FIG. 14.

FIG. 10 provides a perspective view of left hand side extension screen frame 92 of FIG. 19 of the drawings, which encompass left side circular extension screen fingertip grip 10 of FIG. 1, T/B copper lined interlocking slots 94, T/B flexible metallic arms 96, T/B impressed locking grooves 98, T/B interlock cavities 100. Excluding flexible metallic arms 96 measurements of ³⁄₁₆ by ³⁄₁₆ inches and ¹⁄₁₆ inch in diameter, overall dimensions of extension screen frame 92 are 2⁷⁄₁₆ by 4⁷⁄₁₆ inches and ³⁄₁₆ inches in diameter.

Figure 11:
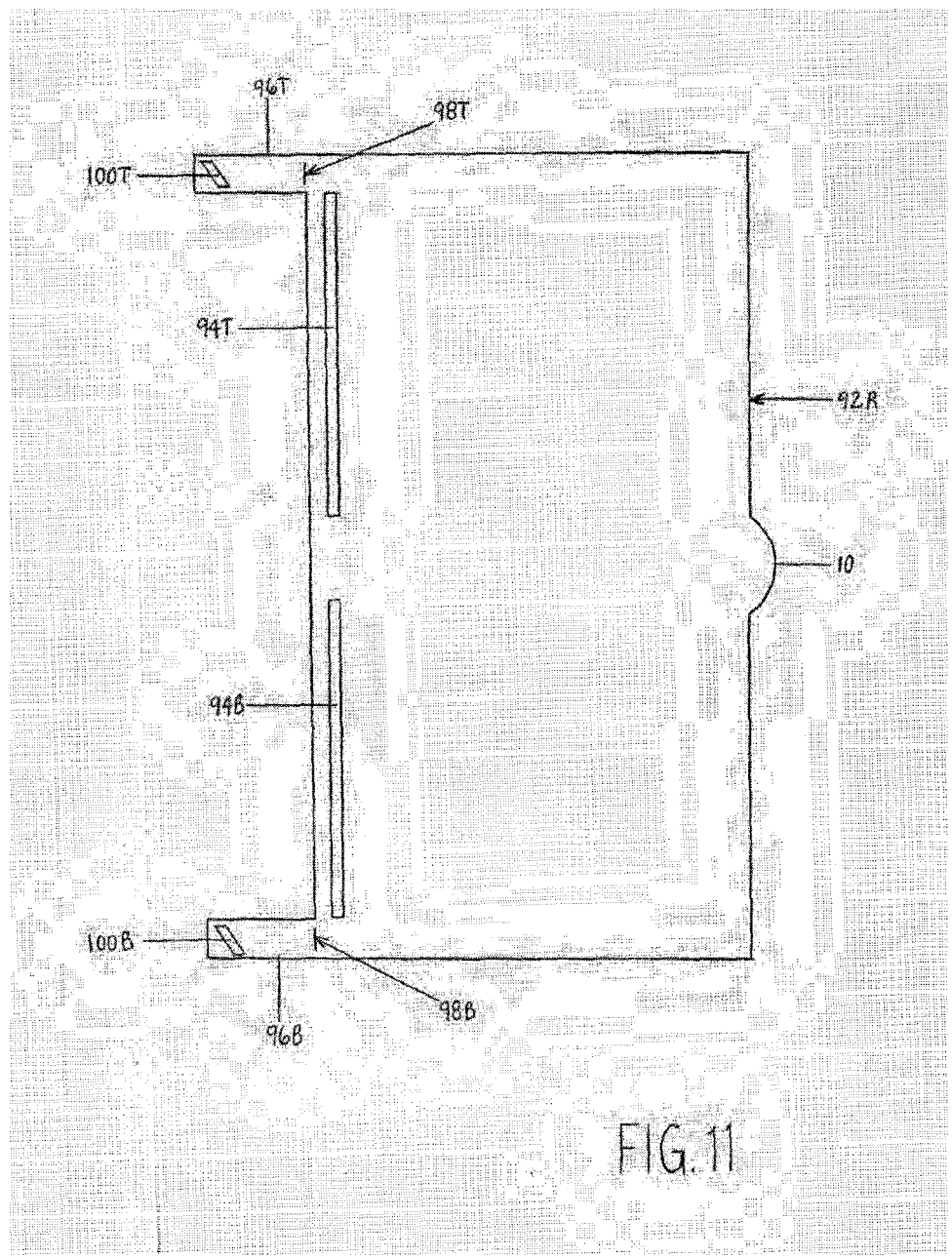
FIG. 11 is a perspective view of right hand side extension screen frame of FIG. 19 below.

FIG. 11 provides a perspective view of right hand side extension screen frame 92 of FIG. 19 of the drawings, which encompass right side circular extension screen fingertip grip 10 of FIG. 1, T/B copper lined interlocking slots 94, T/B flexible metallic arms 96, T/B impressed locking grooves 98, T/B interlock cavities 100. As results of a front/rear positional order setting with left hand side extension screen frame 92 of FIG. 10 (as clearly shown in FIG. 21 of the drawings), right side extension screen frames 92 flexible metallic arms 96 are necessary shorter than those of left side extension screen frame 92 which occupy the rear position order inside FIG. 21's top and bottom slide track chambers' 106 twofold passageway/storage compartments 110, to ensure equal leverage upon both extension screen frames 92 extraction and retraction operational functions of FIGS. 19, 21 and 25 of the drawings. Excluding right side flexible metallic arms 96 measurements of ⁹⁄₁₆ by ³⁄₁₆ inches and ¹⁄₁₆ inch in diameter, overall dimensions of right side extension screen frame are 2⁷⁄₁₆ by 4⁷⁄₁₆ inches and ³⁄₁₆ inches in diameter.

Figure 12:
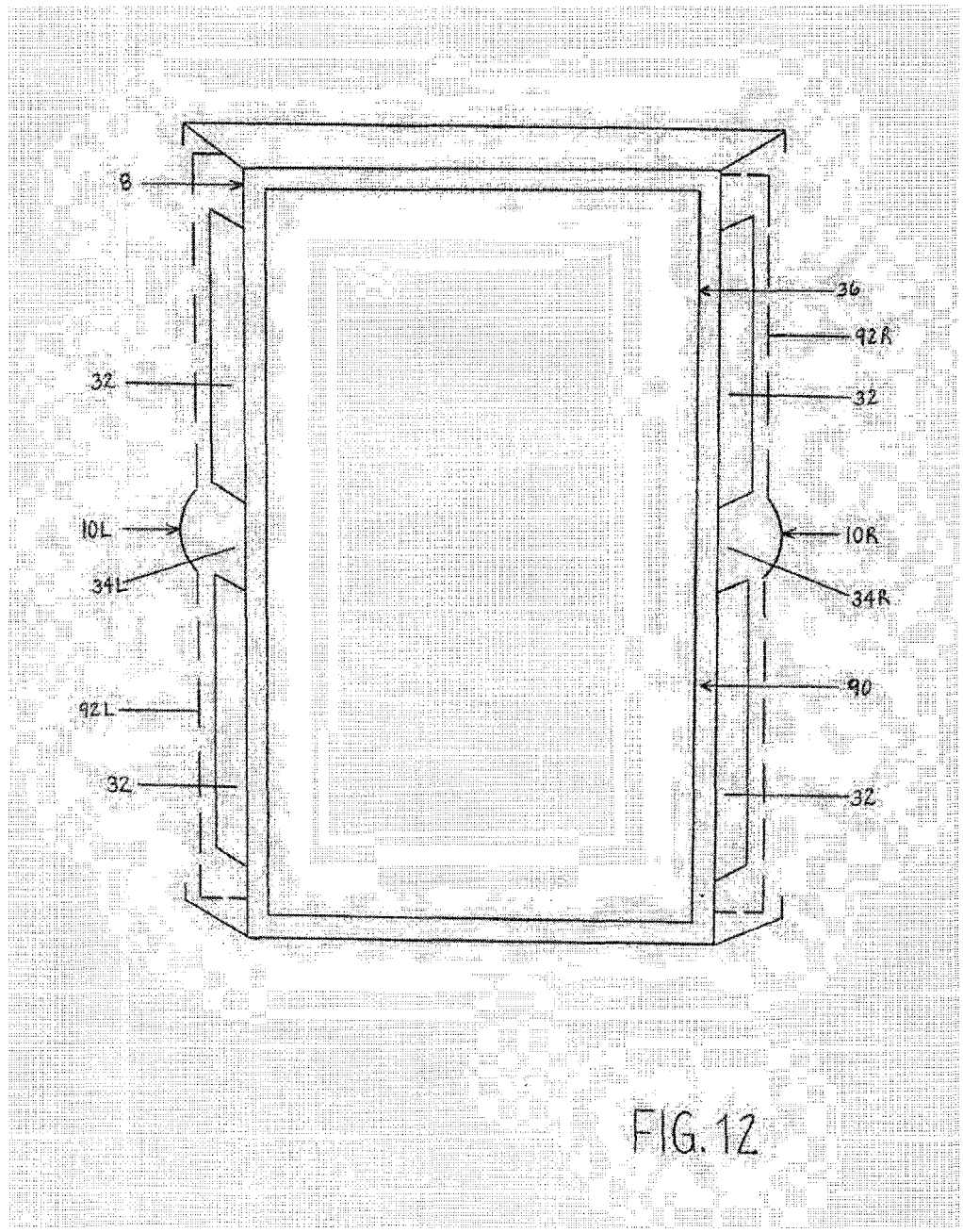
FIG. 12 is a perspective view of encased display screen and middle sectional prefabrication frame structure of FIG. 9 showing retracted extension screens (broken lines) of FIG. 11 at opposite sides of display screen.
Figure 21:
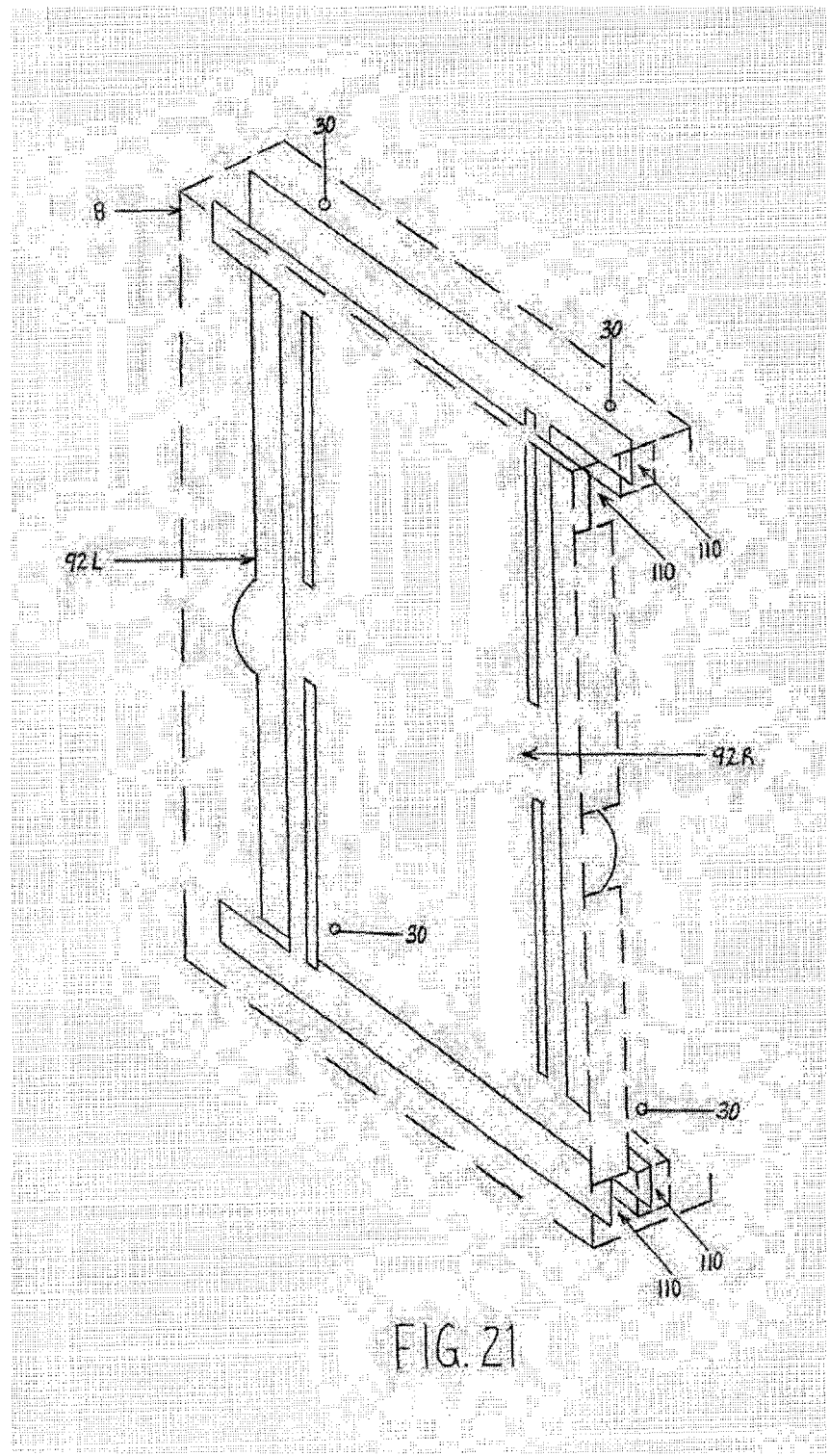
FIG. 21 is a perspective interior view of display screen middle sectional prefabrication frame structure of FIG. 19, showing stored extension screens in full retraction inside twofold passageway and storage compartments of FIG. 18.

FIG. 12 provides a perspective-assembled view of display screen middle prefabrication 8 frame structure of FIG. 9, which encompass retracted left/right hand side extension screen frames 92 (dashed lines) of FIGS. 10, 11 and 21 of the drawings, display screen prefabrication 8 interlock ridges 32, L/R display screen prefabrication 8 middle spacings 34, L/R circular extension screen fingertip grips 10 of FIG. 1, display screen logic board 36 with attached monitor display screen 90 (narrow spacing encasement) of FIG. 9A. Interlock ridges 32 which are firm, stationary flaps of either sides of display screen middle prefabrication 8 frame structure of FIGS. 2 and 19 of the drawings have dimensions of ³⁄₁₆ by 1⁹⁄₁₆ inches and ¹⁄₁₆ inches in diameter.

Figure 13:
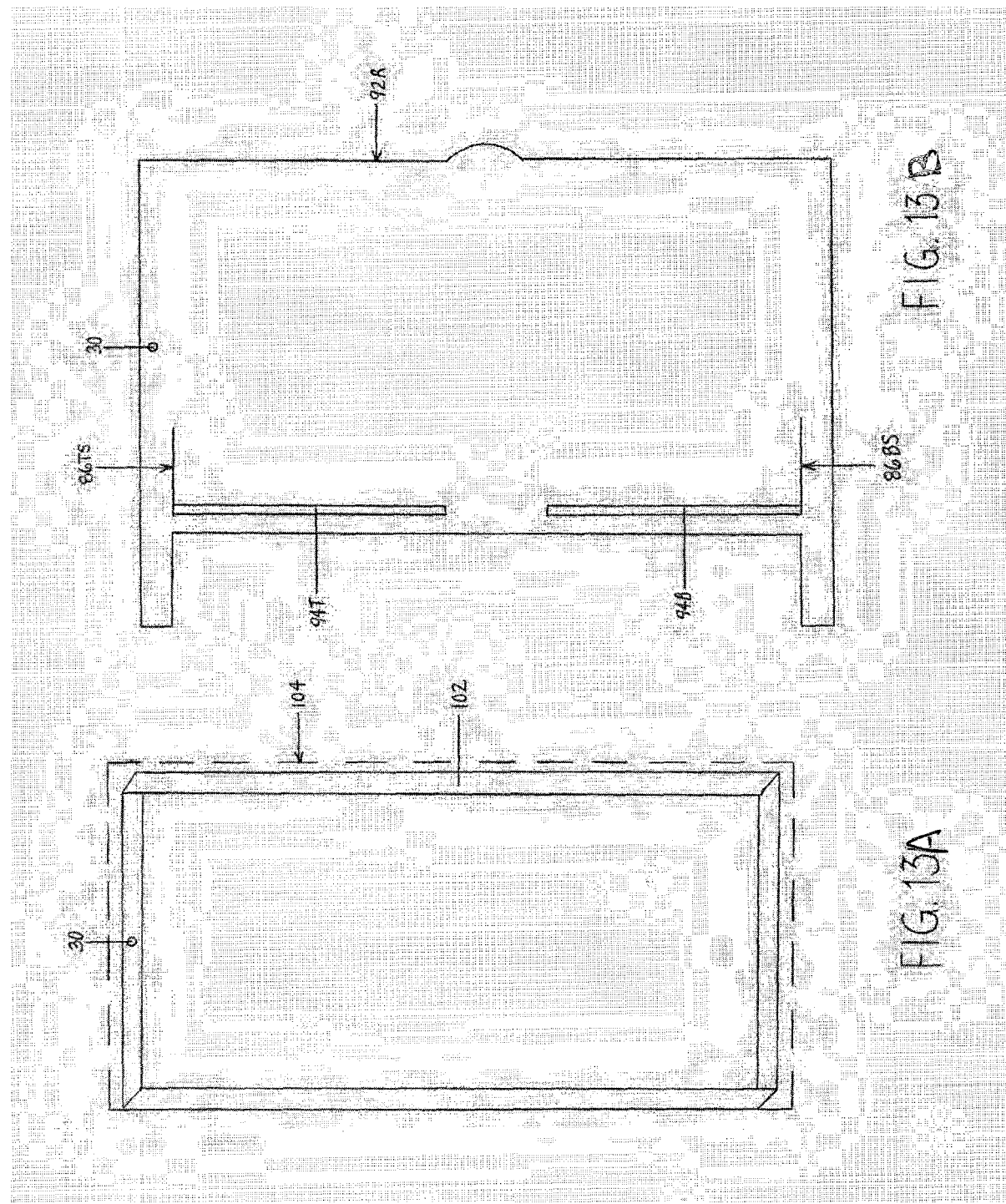
FIG. 13A is a perspective view of extension screen logic board of FIG. 14 below, with attached display screen of FIG. 23 below.
FIG. 13B is a forward shell view of right hand side extension screen frame of FIG. 11 with impressed copper lining interlocking slots and ribbon band power line connectors.
Figure 14:
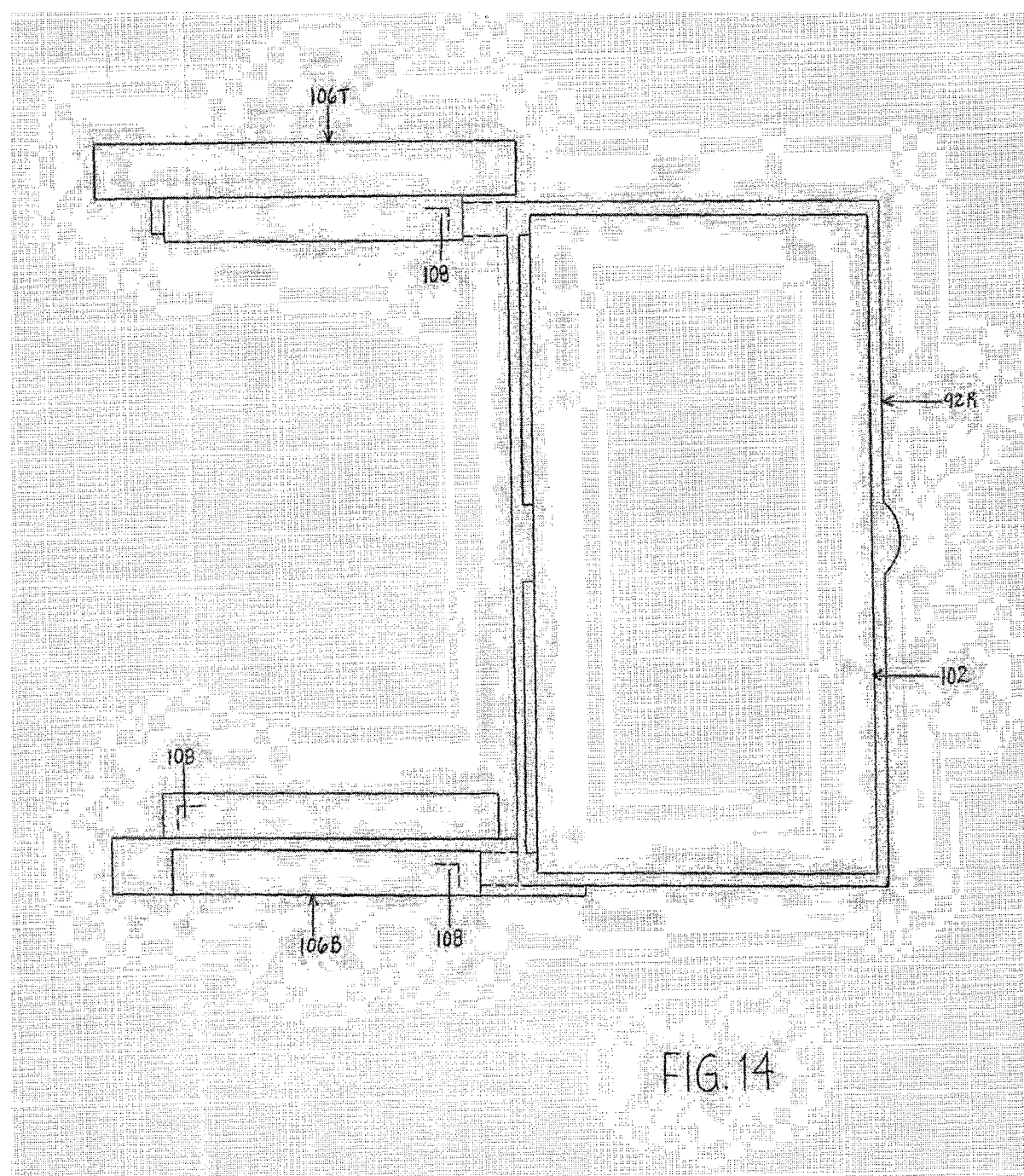
FIG. 14 is a perspective view of a joint assemblage of FIG. 13A and FIG. 13B as a right hand side extension screen of FIG. 11A, mounted to interior mechanisms of top and bottom slide track chamber units of FIG. 15C and FIG. 15D below.

FIG. 13 provides a detachment view of extension screen frame 92 logic board 102 of FIG. 14 of the drawings, which encompass attached monitor display screen (104) encasement (dashed lines) and micro-screw assembly hole 30. Logic board 102 framing which is metallic, and attached display screen 104 encasement mounts inside extension screen frame 92 structure of FIG. 13A by way of logic boards 36 micro-screw assembly hole 30.

FIG. 13A provides an interior view of right hand side extension screen frame 92 structure of FIG. 11, which encompass a micro-screw assembly hole 30, and T/B copper lined interlocking slots 94 with attached T/B short copper ribbon band line connectors 86 (as shown). Upon assemblage of extension screen frame 92 attachment with logic board 102 encasement of FIG. 13, extension screen frame 92 T/B short copper ribbon band line connectors 86 fasten to logic board circuitry (not shown) for power integration with T/B copper lined interlocking slots 94. Dimensions of interlocking slots are ¹⁄₁₆ by 1¾ inches and ¹⁄₁₆ inches in diameter.

Figure 22:
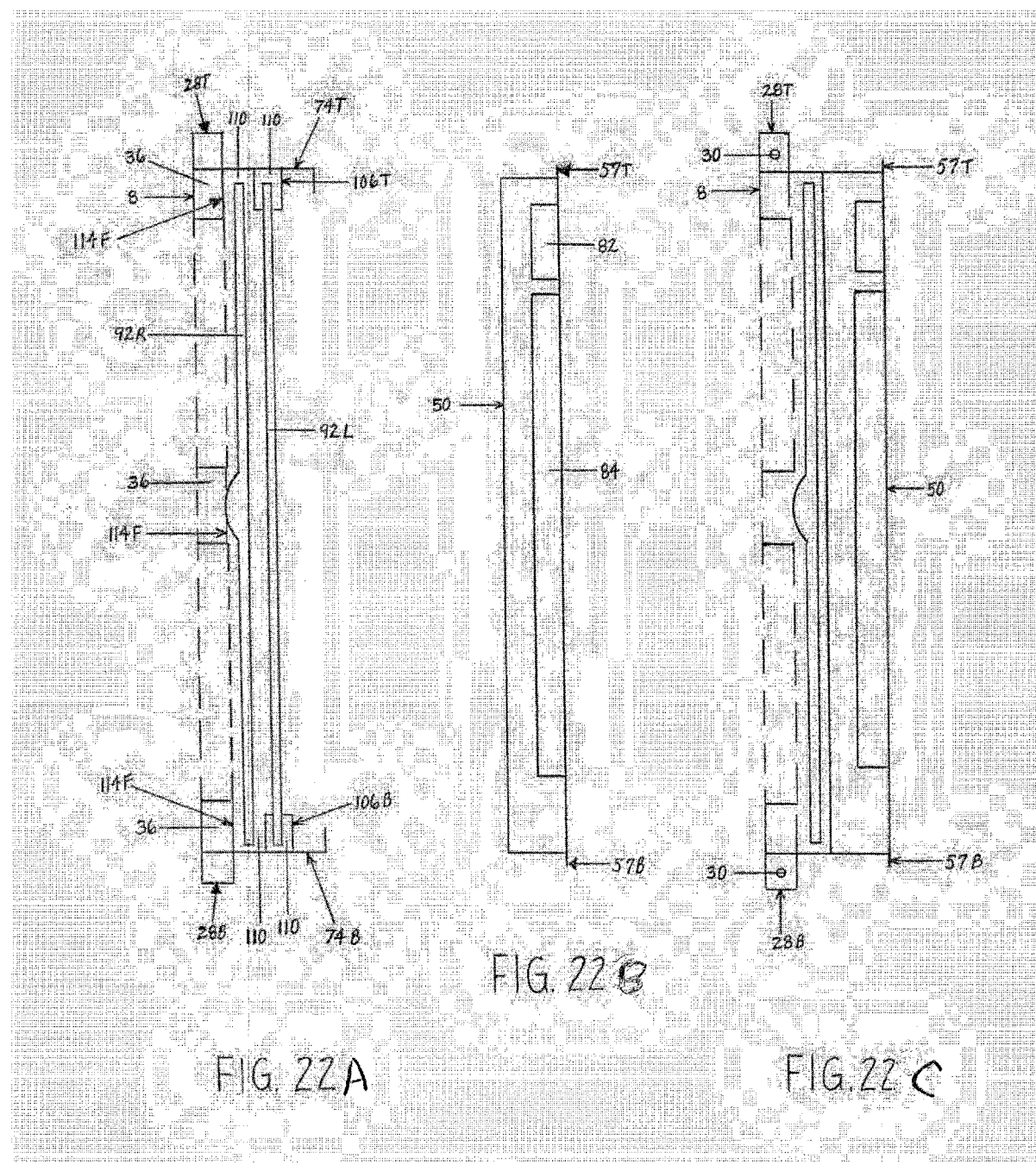
FIG. 22A is a side view profile of FIG. 21, partially showing combination left and right extension screen frames of FIG. 21 inside slide track chambers twofold passageway/storage unit of FIG. 18.
FIG. 22B is a side view profile of a rear sectional prefabrication of FIG. 7, showing interior enclosures of battery and combination camera lens/camera flash compartments.
FIG. 22C is a perspective side view of FIG. 22A and FIG. 22B in joint assemblage.

FIG. 14 provides a perspective view of right hand side extension screen frame 92 of FIG. 13B in assemblage with extension screen 92 logic board encasement 102 of FIG. 13A mounted inside top and bottom slide track chamber 106 shells of FIGS. 15C and 15D of the drawings, where upon slide track chamber 106 shells encompass locking mechanism snags 108 which protrudes (dashed lines) inwardly and trap locks into extension screen frames' 92 of FIGS. 10 and 11 interlock cavities 100 upon entrapment inside slide track chambers 106 storage compartments 110 of FIGS. 21 and 22 of the drawings. Dimensions of interlock cavities 100 are ⅛ by ⅛ inches.

FIG. 15A provides a perspective detachment forward view of top slide track chamber 106 shell of FIG. 14 which encompass two-fold passageway/storage compartments 110 amongst other interior components, dimensions of top slide chamber 106 are 2⁵⁄₁₆ by ¼ inches and ⁷⁄₁₆ inches wide.

FIG. 15B provides an assemblage interior view of bottom slide track chamber 106 shell of FIG. 14, which encompass two-fold passageway and storage compartments 110 of FIG. 15A, a center divider 112 (as more clearly shown in FIG. 15E) which separate left and right hand side extension screen frames 92 of FIG. 21 when both are retracted inside slide track chambers' 106 top to bottom two-fold passageway and storage compartments 110 of FIGS. 21 and 22 of the drawings. Dimensions of bottom slide track chamber 106 are 2⁵⁄₁₆ by ¼ and ⁷⁄₁₆ inches wide.

FIG. 15C provides a detachment view of top slide track chamber 106 shell of FIG. 14.

FIG. 15D provides a detachment view of bottom slide track chamber 106 shell of FIG. 14.

FIG. 15E provides a perspective isolation view of slide track chamber 106 center divider 112 (relevant dashed lines) of FIG. 15B which dimensions are 1¹⁵⁄₁₆ by ⁵⁄₁₆ and ¹⁄₁₆ inches thick.

Figure 16:
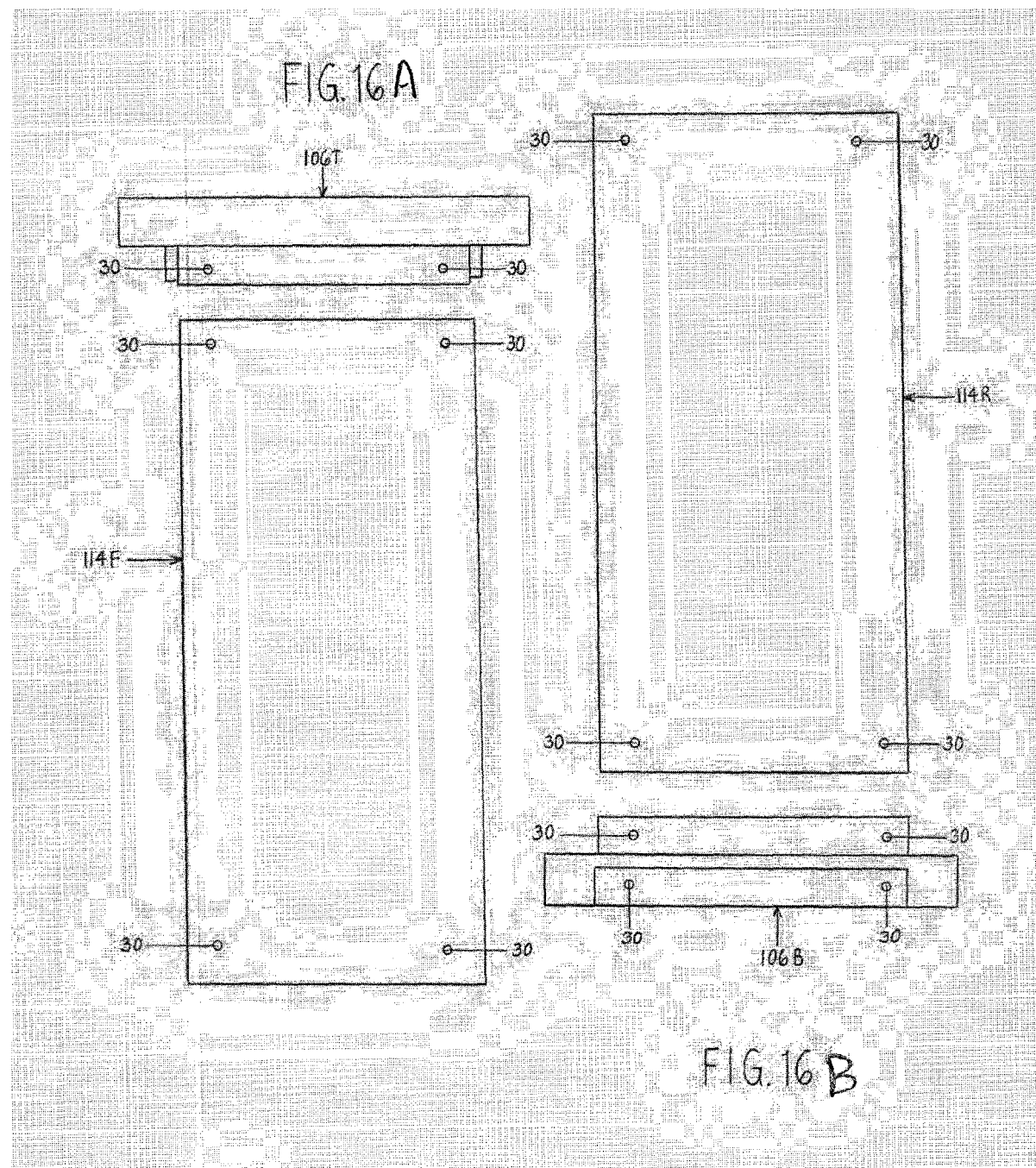
FIG. 16A is a perspective view of top slide track chamber of FIG. 15C and front slide track chamber assemblage plate of FIG. 17 below, showing interconnection assembly holes.
FIG. 16B is a perspective view of rear slide track chamber assemblage plate of FIG. 15D, showing interconnection assembly holes.
Figure 17:
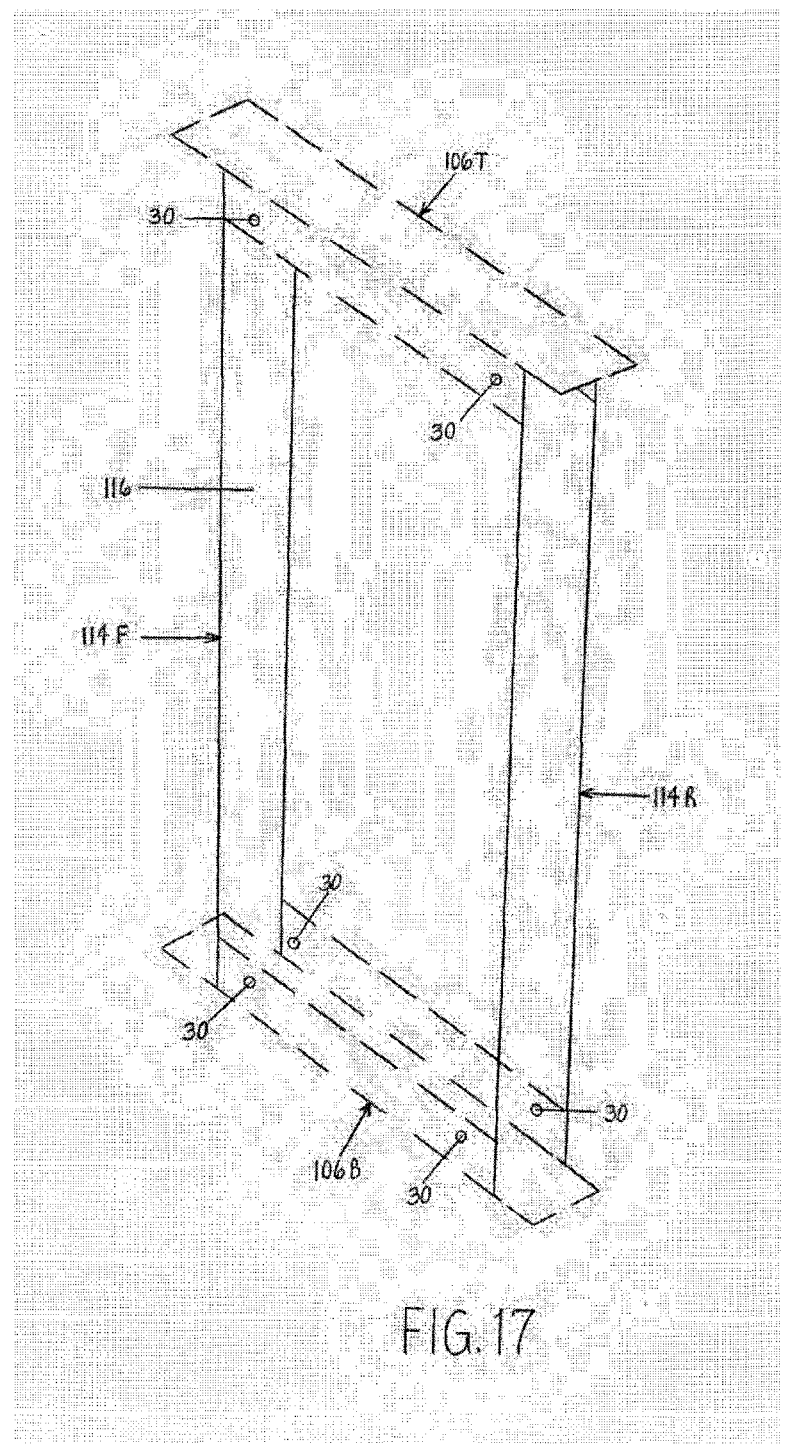
FIG. 17 is an assembled view of top/bottom slide track chambers, and front/rear slide track chambers assemblage plates of FIG. 16A and FIG. 16B as shelled twofold passageway/storage unit of FIG. 18 below.

FIG. 16A provides an alignment view of top slide track chamber 106 shell with micro-screw assembly holes 30 of FIG. 15C and slide track chambers 106 front assemblage plate 114 of FIG. 17 of the drawings, which encompass micro-screw assembly holes 30. By way of their respective micro-screw assembly holes 30 top slide track chamber 106 shell and slide track chambers' 106 front assemblage plate 114 assembles together. Dimensions of front assemblage plate 114 are 1¹⁵⁄₁₆ by 4½ inches and ¹⁄₁₆ inches thick.

FIG. 16B provides an alignment view of bottom slide track chamber 106 shell with micro-screw assembly holes 30 of FIG. 15D and slide track chambers' 106 rear assemblage plate of FIG. 17 of the drawings, which encompass micro-screw assembly holes 30. By way of their respective micro-screw assembly holes 30 bottom slide track chamber 106 shell and slide track chambers' 106 rear assemblage plate 114 assembles together. Dimensions of rear assemblage plate are 1¹⁵⁄₁₆ by 4½ inches and ¹⁄₁₆ inches thick.

Figure 18:
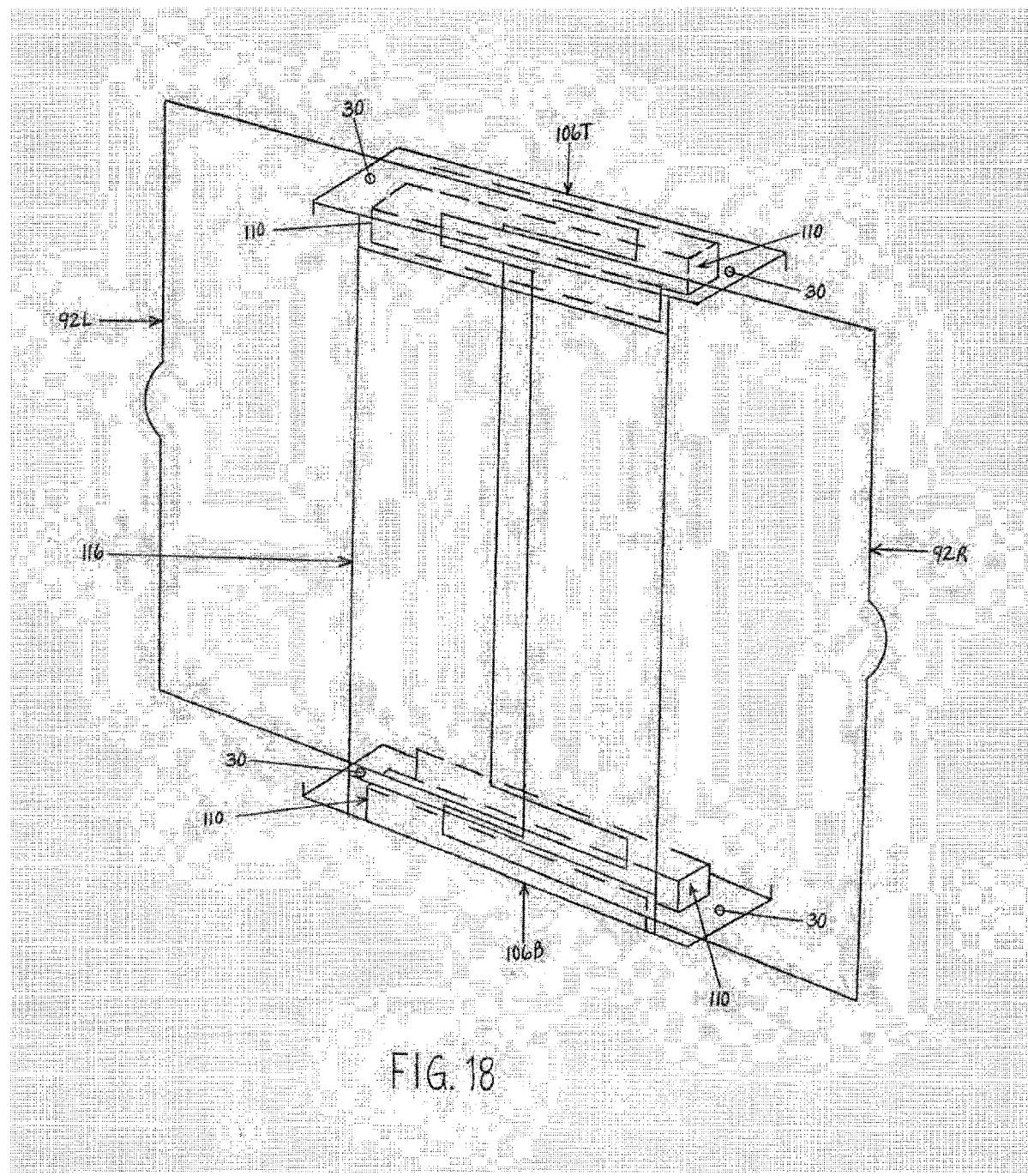
FIG. 18 is a perspective view of twofold passageway/storage unit of FIG. 17 with mounted top and bottom assembled slide track chambers of FIG. 19 below with extension screens of FIG. 12 partially retracted.

FIG. 17 provides a shell view of slide track chambers' 106 two-fold passageway/storage unit of FIG. 18 of the drawings, which configuration is by way of top/bottom slide track chambers 106 and front/rear assemblage plates 114 of FIGS. 16A and 16B.

Figure 15:
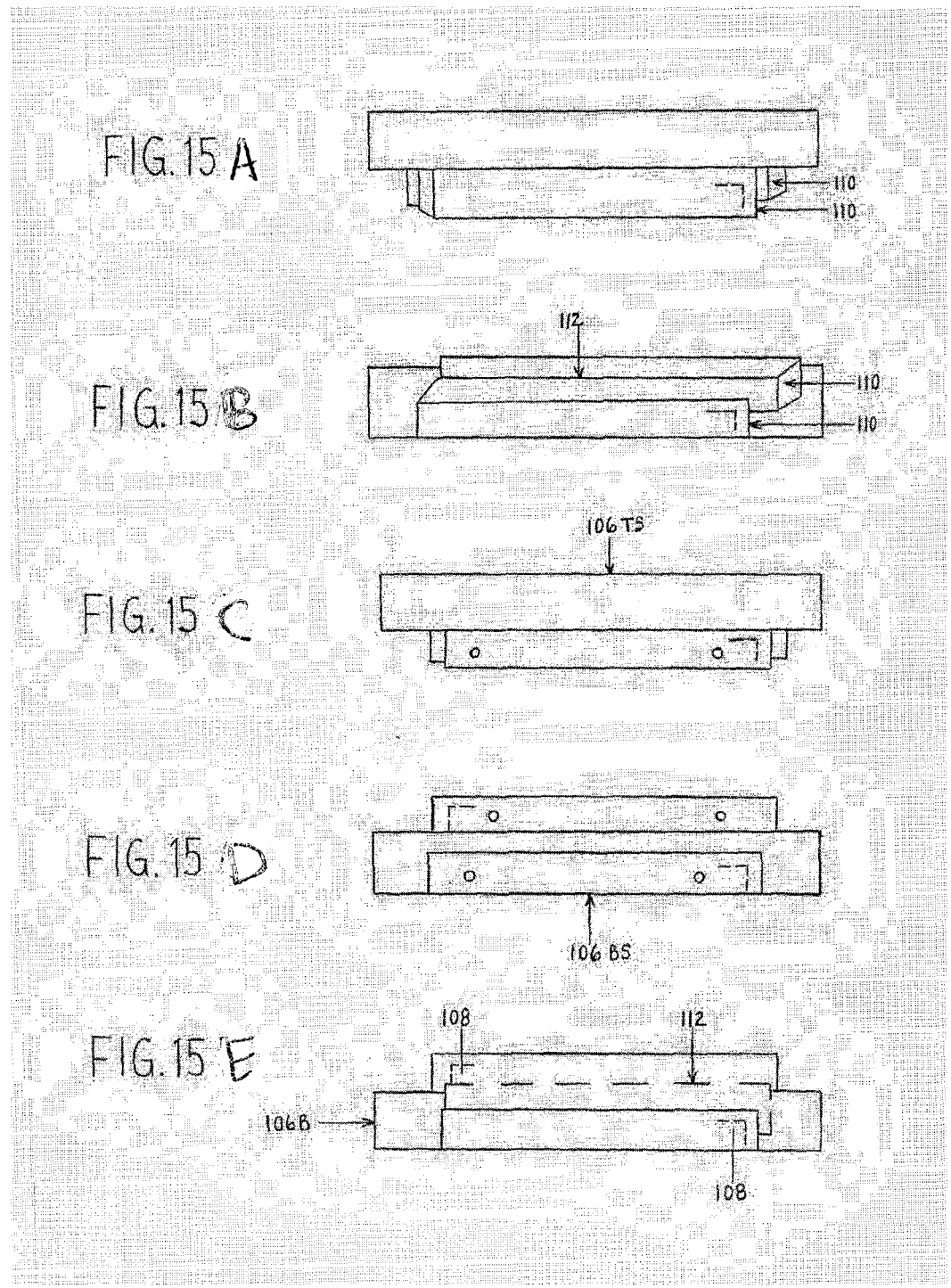
FIG. 15A is a detached exterior view of bottom slide track chamber assemblage of FIG. 19 below, showing twofold passageway/storage compartment tracking chambers.
FIG. 15B is a detachment interior view of bottom slide track chamber unit of FIG. 19 below, showing twofold passageway/storage compartment tracking chambers.
FIG. 15C is a detachment view of top slide track chamber of FIG. 14.
FIG. 15D is a detached view of bottom slide track chamber shell of FIG. 14.
FIG. 15E is a perspective view of top and bottom slide track chambers of FIGS. 15C and 15D, respectively interior center divider.

FIG. 18 provides an assembled interior view of slide track chambers' 106 two-fold passageway/storage unit 116 shell assemblage of FIG. 17, which encompass micro-screw assembly holes 30, mounted top/bottom slide track chambers 106 of FIGS. 15 and 15A, two-fold passageway/storage compartments 110 with partially extracted left/right hand side extension screen frames 92 of FIG. 12 mounted inside passageways 110 of FIGS. 15 and 15A whereby entire two-fold passageway/storage unit 116 mounts in between vast spacing of top/bottom extended framings 74 of display screen prefabrication 8 frame structure of FIG. 6 by way of alignment with relevant extended framings 74 affixed top and bottom micro-screw assembly holes 30.

Figure 20:
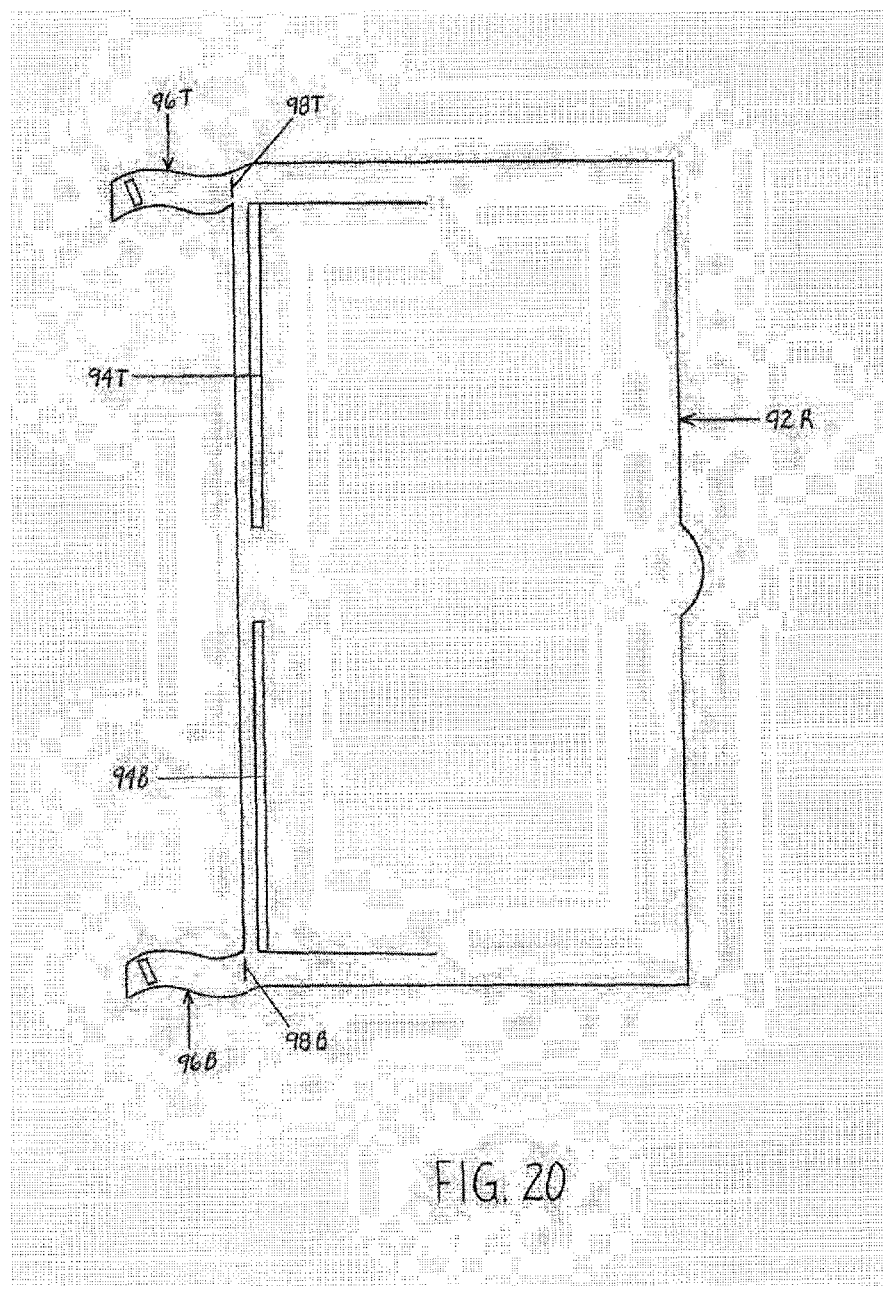
FIG. 20 is a perspective view of both left and right side extension screen frames of FIG. 10 and FIG. 11, respectively, affixed top and bottom flexible metallic arm's wave pattern flexibility.

FIG. 19 provides a perspective interior view of display screen prefabrication 8 frame structure of FIG. 12, which encompass mounted top/bottom slide track chambers 106 of FIG. 18, slide track chambers' 106 center divider 112 of FIG. 15E, display screen prefabrication 8 interlock ridges 32 (small boxed dashed lines), fully extracted left/right hand side extension screen frames 92 of FIG. 18, which encompass top/bottom copper lined inter locking slots 94 and top/bottom flexible metallic arms 96 of FIG. 20 of the drawings, while circular directional arrows of right hand side extension screen frame 92 depicts how either extension screen frames 92 are released from interlockment for retraction back to storage of FIG. 21 of the drawings. Both extension screen frames 92 which are firmly locked into stationary positions by way of their respective inter locking slots 94 attachment with display screen prefabrication 8 inter lock ridges 32 and flexible metallic arms' 96 affixed inter lock cavities 100 entrapment with slide track chambers' 106 locking mechanism snags 108 of FIG. 14, can only be released from interlockment by termination of entrapment tension amongst locking components.

FIG. 20 provides a flexibility view of respective extension screen frames 92 of FIGS. 10 and 11 flexible metallic arms' 96 adaptability (as more clearly shown with flexible metallic arms 96 of left hand side extension screen frame 92 of FIG. 19), which encompass impressed locking grooves 98 of FIG. 19. Impressed locking grooves 98, which serves as stoppage points upon extension screen frames 92 of FIG. 19 full extraction from slide track chambers' 106 two-fold passageway/storage unit 116 of FIG. 18, limit flexible metallic arms' 96 movement during extraction process through slide track chambers' 106 passageways 110 whereby preventing either extension screen frame 92 from being completely extracted from their respective assemblage inside slide track chambers' 106 two-fold passageway/storage unit 116.

FIG. 21 provides an interior view of retracted extension screen frames 92 of FIG. 19 storage behind display screen middle prefabrication 8 of FIGS. 1 and 22 of the drawings, which encompass micro-screw assembly holes 30 and top/bottom slide track chambers' 106 storage compartments 110 of FIG. 18. By way of micro-screw assembly holes 30 FIG. 21 aligns with FIG. 7 for a side view configuration of FIG. 22B of the drawings.

FIG. 22A provides a perspective side view of display screen middle prefabrication 8 frame structure of FIG. 21, which encompass T/B assembly pegs 28, T/B extended framings 74, T/B slide track chambers 106 of FIGS. 15 and 15A, display screen logic board 36 of FIG. 5, slide track chambers' 106 front assemblage plate 114 of FIG. 16, slide track chambers' 106 two-fold passageway/storage compartments 110 of FIG. 18 and retracted storage extension screen frames 92 of FIG. 21. Display screen logic board 36 which length extends from top to bottom extended framings 74, transparently occupy the empty spacings in-between display screen prefabrication 8 (outer dashed lines) and slide track chambers' 106 front assemblage plate 114 (parallel of inner dashed lines).

FIG. 22B provides an interior side view of rear sectional prefabrication 50 of FIG. 7, which encompass a rear camera lens/flash compartment enclosure 82, a battery compartment enclosure 84 and T/B rear frame overlaps 57. Battery compartment enclosure 84 which has dimensions of 1¹⁵⁄₁₆ by 3³⁄₁₆ and ³⁄₁₆ inches in diameter has space to pack a sizable 3220 mah battery which is removable in the event one would like to swap a dead battery for a fully charged one. With extension screens 92 of FIG. 23 of the drawings being a featured attraction one need not worry about the battery life potential of the 3220 mah battery which is bigger than that of the 3200 mah battery generally found in leading brand smart phones, as the 3220 mah battery can last an entire day with heavy usage of either extension screen 92 in operation individually or together with attached display screen 90 of FIG. 23. Dimensions of rear camera lens/flash compartment enclosure 82 are ⁶⁄₁₆ by ⁷⁄₁₆ and ³⁄₁₆ inches in diameter.

FIG. 22C provides a joined side view assemblage of FIGS. 22A and 22B, which encompass micro-screw assembly holes 30, T/B assembly pegs 28 of FIG. 2, and T/B rear frame overlaps 57 of FIG. 3. In assemblage top 6 and bottom cap 12 prefabrications respectively of FIGS. 4 and 4A by way of their respective assembly cavities 26 of FIG. 2, aligns with T/B assembly pegs 28 affixed micro-screw assembly holes 30 and T/B rear frame overlaps 57 for configuration attachments of FIG. 25 of the drawings. Rear frame overlaps 57 dimensions are 2⁶⁄₁₆ by ⅛ and ¹⁄₁₆ inches in diameter.

Figure 23:
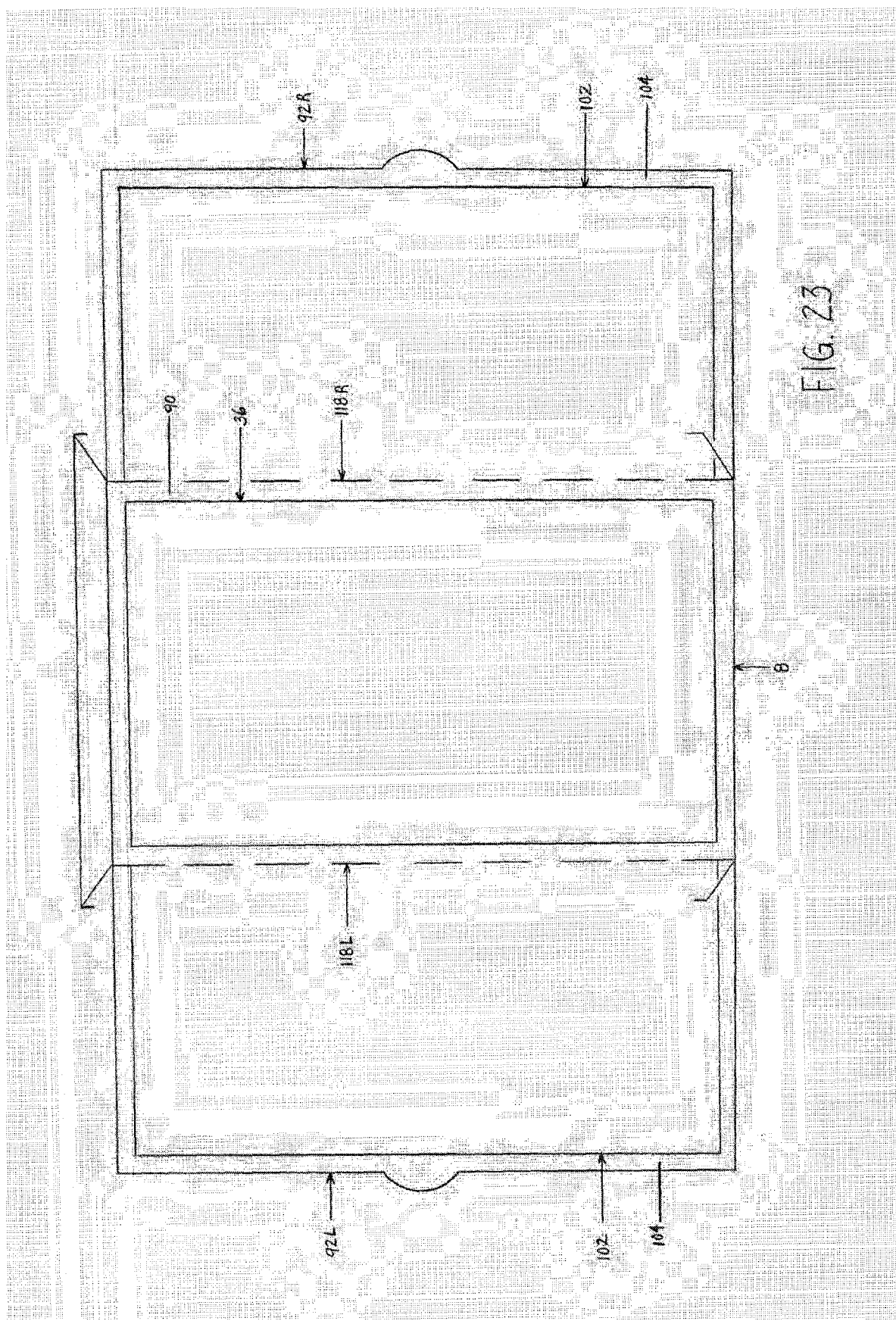
FIG. 23 is a perspective forward view of display screen middle sectional prefabrication frame structure of FIG. 12 with fully extracted, logic board assembled display screen(s) of FIG. 14 at either side.
Figure 24:
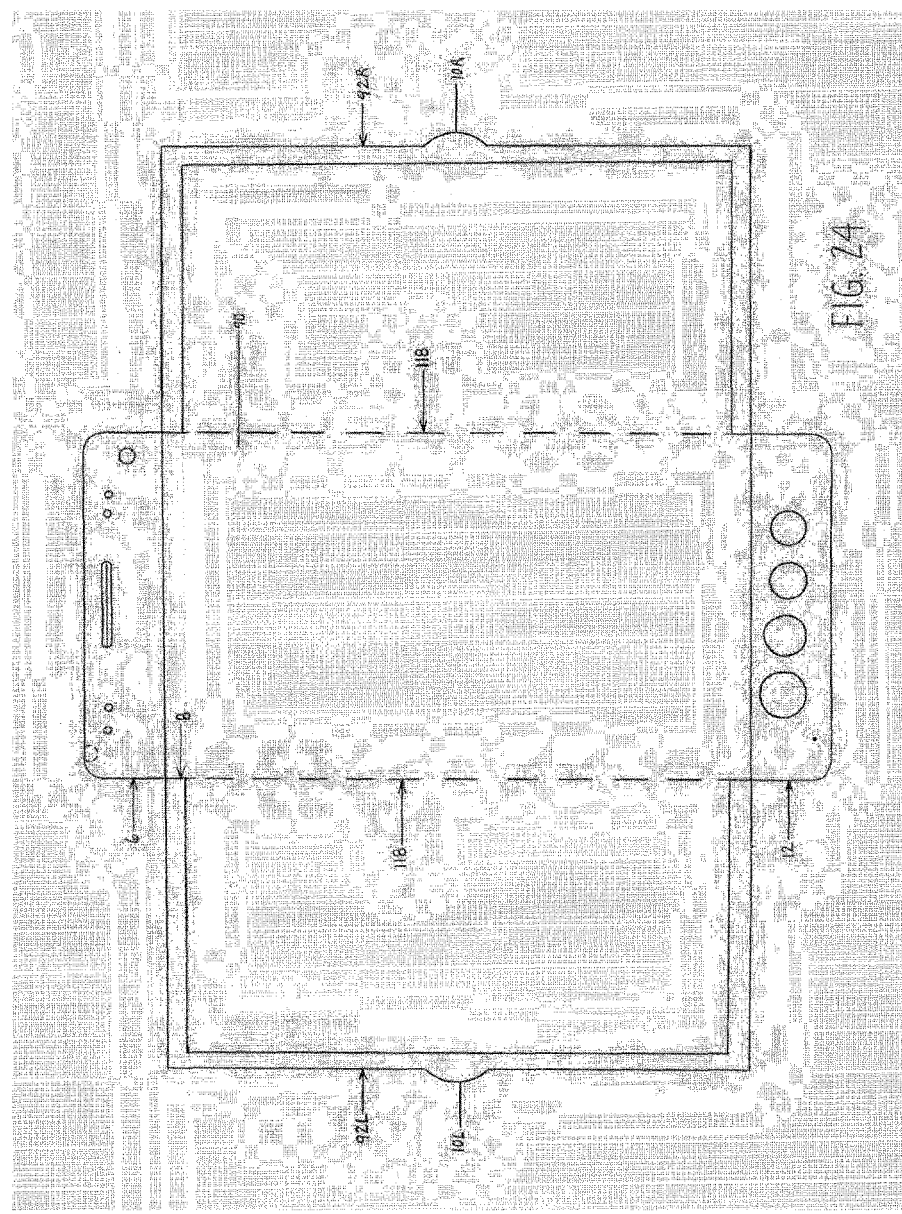
FIG. 24 is a perspective view of FIG. 1 with fully retracted dual extension screens of FIG. 23 locket in position at either side of main display screen.

FIG. 23 provides a perspective view of display screen middle prefabrication 8 of FIG. 12, which encompass display screen logic board 36 of FIG. 2, fully extracted extension screens 92 and L/R frameless creased edges 118 of FIG. 24 of the drawings. While display screen logic board 36 encompass several electronic circuits (not shown), which renders it satisfactory for software programming, fully extracted extension screens 92 encompass extension screen logic board encasement of FIG. 13B. Both extension screens 92 by way of their attached display screen 104 contour tapered edges (dashed lines) of extension screen logic board encasement of FIG. 13A, blends level with frameless creased edges 118 (dashed lines) of attached display screen 90 encasement of FIG. 9B for a smooth transition upon extension screens 92 extraction from storage of FIG. 21 to ether sides of middle display screen 90 shown.

FIG. 24 provides an overall perspective view of FIG. 1 with fully extracted extension screens 92 of FIG. 23 joined at either sides of middle display screen prefabrication 8, which encompass L/R frameless creased edges 118 of FIG. 23, L/R circular extension screen fingertip grips 10 of FIG. 1. L/R frameless creased edges 118 which are make shift framing lines at either sides of attached display screen 90 (dashed lines) of FIG. 9B help create an authentic appearance of a singular large middle display screen 90 with extension screens 92 of FIG. 23 joined at either sides of display screen 90 where upon frameless creased edges 118 fade with contour tapered ends of either extension screen 92 for distinct appearance of one large display screen where in middle display screen 90 dimensions increase from 2⁵⁄₁₆ by 4½ inches to 7⅛ by 4⅜ inches.

FIG. 25 provides a perspective side view of FIG. 1 in actual dimensions, which encompass top 6 and bottom cap 12 prefabrications respectively of FIGS. 4A and 4B, display screen middle prefabrication 8 frame structure of FIG. 21, rear sectional prefabrication 50 of FIG. 7 where in all prefabrications are assembled as three-dimensional extension screen SMART PHONE of FIG. 1.

To operate my new SMART PHONE a user must extract both extension screens 92 of FIG. 24 from storage behind display screen middle prefabrication 8 of FIG. 21 where in the extension screens 92 are attached by their respective top and bottom flexible metallic arms 96 of FIG. 20 inside top and bottom slide track chambers 106 of FIG. 19. Both extension screens 92 are extracted when a user grasps either screens' 92 respective circular fingertip grip 10 of FIG. 1 and pulls outwards where upon extension screens 92 of FIG. 24 appear at either sides of middle display screen 90.

Upon extension screens 92 consolidation with display screen 90 of FIG. 23, extracted extension screens 92 which are fastened unto embedded copper power track connectors 78 of FIG. 9 by way of extension screens 92 inter locking slots 94 of FIG. 19, are instantly powered with display screen 90 where upon L/R motion sensors 16 of FIG. 2 automatically integrate extension screens 92 operational functions with those of middle display screen 90 of FIG. 23, while operational functions between display screen 90 and top 6/bottom cap 12 prefabrications of FIG. 2 comes by way of top/bottom female ribbon band connectors 66 respectively of FIGS. 4 and 4A intercourse with top/bottom male ribbon band connectors 38 of FIG. 2.

Both extension screens 92 upon full extraction from storage of FIG. 21 by way of their respective interlock cavities 100 entrapment with locking mechanism snags 108 of FIG. 14 and either screens' 92 respective inter locking slots 94 of FIG. 19 attachment with inter lock ridges 32, locks into stationary positions of FIG. 19 as shown, where upon neither screen 92 can be unlocked for retraction back to storage except by sight upwards lifting on either screens' 92 rear surface as directional arrows of FIG. 19 depicts. Once locking tension is released by upwards lifting both extension screens 92 slides easily from interlock ridges 32 of FIG. 19 for retraction back to storage of FIG. 21 where neither screen 92 can be totally extracted from respective assemblage inside slide track chambers' 106 two-fold storage compartments 110 as extension screens' 92 impressed locking grooves 98 of FIGS. 10 and 11 are designed for such prevention.

When middle display screen 90 of FIG. 23 is joined with extracted extension screens 92 of FIG. 24 at either sides, middle display screen 90 dimensions of 2⁵⁄₁₆ by 4½ inches increase to 7⅛ by 4⅜ inches where upon extension screen SMART PHONE, equipped to operate off today's relevant SMART PHONE software, overall appearance of FIG. 1 transform into that of FIG. 24 with a conveniently located volume control bar 52 on rear side of top cap 6 prefabrication.

Alternative Embodiments

Alternatively, instead of an extension screen slide track chambers concept where by additional viewing screens can be joined at either side of middle display screen upon extraction from two-fold passageway/storage compartments of mounted slide track chambers, extension screens can also be consolidated with middle display screen by way of snap, latch, or hook attachment, and any other relevant means where in extension screens can be an ideal feature at either sides, tops, or bottoms of any SMART PHONE and conventional cell phone alike display screens.

Having fully explained my invention, I claim the concepts of a SMART PHONE slide track chamber system in which extension screens by way of circular fingertip grips can be extracted from two-fold passageway/storage compartments for effects of a much larger viewing screen upon extension screens consolidation at either sides of middle display screen, I further claim a three-dimensional extension screen SMART PHONE multi-task concept, where by SMART PHONE and conventional cell phone users alike can simultaneously multi-task in select internet activity on three separate viewing screens as results of a prefabricated SMART PHONE with featured individual extension screens.

2. Operation of the Preferred Embodiment

To operate the invention's dual extension screen, a user must extract extension screens 92 of FIG. 24 from storage behind display screen middle section prefabrication 8 of FIG. 21, wherein extension screens 92 are attached by their respective top/bottom flexible metallic arms 96 of FIG. 20 to interior of top and bottom slide track cambers 106 of FIG. 19. Both extension screens 92 are extracted when a user grabs either screen's respective circular fingertip grip 10 of FIG. 1 and pull outwards, whereupon extension screens 92 of FIG. 24 appear at either side of the main display screen 90.

Both extension screens 92 upon extracted consolidation with main display screen 90 of FIG. 23 are instantly empowered with main display screen 90 as extracted extension screens 92 are fastened onto embedded copper powertrack connectors 78 if FIG. 9 against extension screens 92 copper lined interlocking slots 94 of FIG. 19, whereupon left and right hand side motion sensors 16 of FIG. 2 automatically integrate extension screens operational functions with those of main display screen 90 of FIG. 23, while operational functions between main display screen 90 and top cap/bottom cap sectional prefabrications 6 and 12 respectively of FIG. 2 comes through top and bottom female ribbon band connectors 66 of FIGS. 4A and 4B attachment with top and bottom male ribbon band connectors 38 of FIG. 2.

As shown in FIG. 19, both extension screens 92 upon full extraction locks into stationary positions by way of each respective interlock cavities 100 of FIGS. 10 and 11 entrapment against locking mechanism snags 108 of FIG. 14 and interlocking slots 94 of FIG. 19 attachment to interlock ridges 32. Once locked into stationary positions neither extension screen 92 can be unlocked for retraction back to storage except by slight upwards lifting on either screens 92 rear surface as directional arrows of FIG. 19 depict. Neither extension screen 92 can never be intentionally or over extracted from its position of assemblage as impressed locking grooves 98 of FIGS. 10 and 11 are designed as safeguard for such prevention.

Main display screen 92 of FIG. 23 when consolidated with extracted extension screens 92 of FIG. 24, increase in overall dimensions of 2⅜ by 4½ inches to 7⅛ by 4⅜ inches with a conveniently located volume control bar 52 on rear side of top cap sectional prefabrication 6.

The foregoing descriptions of specific embodiments of the present invention are presented for purposes of illustration and description. They are not intended to be exhaustive nor to limit the invention to precise forms disclosed and, obviously, many modifications and variations are possible in light of the above teaching. By way of example, and not as a limitation, the extension screens can be attached to the immediate sides of main display screen by way of hook or latch attachment; the four manual control buttons affixed to the bottom cap sectional prefabrication can be integrated into the tough screen operational functions; the slide tracking chamber system in which the extension screens are retractable can be easily adapted for electrical operational function; and extension screens can be affixed for vertical extraction/retraction fixture at the top and bottom of the devices, as opposed to the present design of horizontal. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of *Warner-Jenkinson Company, v. Hilton Davis Chemical*, 520 US 17 (1997) or *Festo Corp. v. Shoketsu Kinzoku Kogyo Kabushiki Co.*, 535 U.S. 722 (2002), or other similar caselaw or subsequent precedent should not be made if any future claims are added or amended subsequent to this Patent Application.

What is claimed is:

1. A three dimensional extension screen smart phone comprising:
    a top cap sectional prefabrication;
    a display screen middle sectional prefabrication;
    a prefabricated extension screen twofold passageway/storage unit;
    a rear sectional prefabrication;
    a bottom cap sectional prefabrication;
    said top cap sectional prefabrication having impressed assembly cavities, an earplug jack, a pair of extension screen motion sensors, a speaker, a proximity sensor, a gesture sensor, a front camera lens, and a rear volume control bar constructed within said prefabrication's interior;
    said display screen middle sectional prefabrication having functional unit comprising: a central data process unit; a memory unit; a display element; multiple user interfaces; a wireless transceiver configured for wireless data communication using the same frequency ranges of a GHz Frequency band for sending and receiving data; wherein each of the function units being functionally connected to at least the central data processing unit.

2. The three dimensional extension screen smart phone of claim 1, further comprising:
    a logic boars;
    extended framing forming micro screw assembly holes;
    affixed assembly pegs for connect to said micro screw assembly holes;
    contour display screen middle spacings;
    interlock ridges; and
    copper ribbon band connectors.

3. The three dimensional extension screen smart phone of claim 2 wherein:
    said prefabricated extension screen twofold passageway/storage unit being sized to fit entirely in between joint assemblage spacing of top and bottom cap sectional prefabrications, said twofold passageway/storage unit having dual extension screens thereof attached to interior of mounted top and bottom side track chambers in which said slide track chamber's mechanism twofold passageway/storage compartment housing unit provides relevance in connection of dual extension screen's operational functions.

4. The three dimensional extension screen smart phone of claim 2, wherein said rear sectional prefabrication further comprises:
    an off/on switch bar;
    a camera lens;
    top and bottom rear framing overlaps;
    a camera lens flash;
    a battery compartment door;
    an electrical power outlet; and
    top/bottom micro screw assembly holes.

5. The three dimensional extension screen smart phone of claim 3, wherein said rear sectional prefabrication further comprises:
    an off/on switch bar;
    a camera lens;
    top and bottom rear framing overlaps;
    a camera lens flash;
    a battery compartment door;
    an electrical power outlet; and
    top/bottom micro screw assembly holes.

6. The three dimensional extension screen smart phone of claim 2, wherein said bottom cap sectional prefabrication comprises:
    impressed assembly cavities;
    a microphone;
    a menu button;
    a home button;
    a back button;
    a search button;
    a rear side speaker; and
    a micro screw assembly hole.

7. The three dimensional extension screen smart phone of claim 3, wherein said bottom cap sectional prefabrication comprises:
    impressed assembly cavities;
    a microphone;
    a menu button;
    a home button;
    a back button;
    a search button;

a rear side speaker; and a micro screw assembly hole.

8. The three dimensional extension screen smart phone of claim 4, wherein said bottom cap sectional prefabrication comprises:

impressed assembly cavities;

a microphone;

a menu button;

a home button;

a back button;

a search button;

a rear side speaker; and a micro screw assembly hole.

* * * * *

UNITED STATES PATENT AND TRADEMARK OFFICE
CERTIFICATE OF CORRECTION

PATENT NO. : 9,716,778 B1
APPLICATION NO. : 15/139515
DATED : July 25, 2017
INVENTOR(S) : Derrick Kingsley Walker It is certified that error appears in the above-identified patent and that said Letters Patent is hereby corrected as shown below:

On the Title Page

In the Abstract, should read:
A versatile multiple display screen smart-phone, having configuration of retractable dual extension screen units assembles at either side of device, whereby retracted extension screens can be extracted from a prefabricated interior twofold passageway/storage unit for added multi-tasking convenience and/or combined consolidation with main display screen for display screen enlargement.

In the Specification

In the Background of Invention

Column 1, Lines 33–36 should read:
Thus, a need exists for a more versatile smart phone to satisfy electronic consumer's ultimate demands for a smart phone with a larger display screen without compromising such a device's attractive and compact design.

In the Summary of Invention

Column 1, Line 42 should read:
nected prefabrications and following functional units includ- Column 1, Line 43 should read:
ing: a central data processor; a memory unit; a display In the Brief Description of the Drawings Column 2, Line 38 should read:
9A showing retracted extension screens (broken lines) of FIGS.

Signed and Sealed this
Twenty-third Day of January, 2018

Joseph Matal
*Performing the Functions and Duties of the*
*Under Secretary of Commerce for Intellectual Property and*
*Director of the United States Patent and Trademark Office*

Column 2, Line 39 should read:
10 and 11 at opposite sides of display screen;

Column 2, Line 63 should read:
track chambers of FIGS. 15C and 15D, respectively showing interior Column 3, Line 40 should read:
retracted dual extension screens of FIG. 23 locked in position Column 3, Line 42 should read:
FIG. 23 is an overall perspective side view of FIG. 1, showing In the Drawing Reference Numerals Column 4, Lines 23–24 should read:
82 rear camera lens/flash compartment enclosure Column 4, Lines 25–26 should read:
84 battery compartment enclosure Column 4, Lines 27–28 should read:
86 short/long copper ribbon band line connectors Column 4, Lines 29–30 should read:
88 rear sectional prefabrication shell Column 4, Lines 31–32 should read:
90 attached monitor display screen Column 4, Lines 33–34 should read:
92 left/right side extension screen frames Column 4, Lines 35–36 should read:
94 top/bottom copper lined interlocking slots Column 4, Lines 37–38 should read:
96 top/bottom flexible metallic arms Column 4, Lines 39–40 should read:
98 top/bottom impressed locking grooves Column 4, Line 43 should read:
104 attached extension display screen
106 top/bottom slide track chamber
108 slide track chambers locking mechanism snags
110 slide track chambers twofold passageway and storage compartments 112 slide track chamber's center divider
114 front/rear slide track chamber's assemblage plates
116 assembled extension screen's twofold passageway and storage unit
118 display screen left/right frameless creased edges In the Description of the Preferred Embodiments Column 6, Line 3 should read:
FIG. 4A provides a perspective isolation view of top cap Column 6, Line 8 should read:
FIG. 4B provides a perspective isolation view of bottom Column 6, Line 13 should read:
FIG. 4C provides a shell view of top 6 and bottom cap 12

Figure 4D:
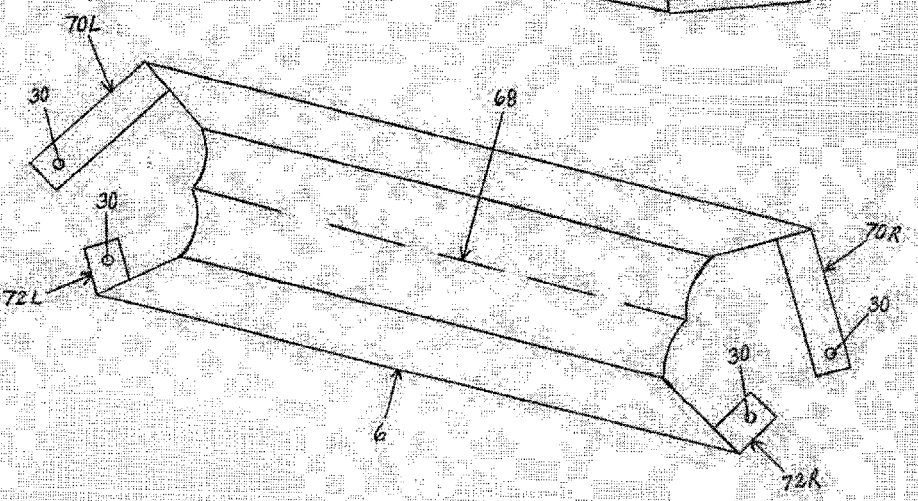
FIG. 4D is an exploded view of FIG. 4C, showing affixed extended framing assemblage.

Column 6, Line 18 should read:
FIG. 4D provides an exploded view of top 6 and bottom Column 7, Line 20 should read:
FIG. 9A provides a framed view of assembled display Column 7, Line 34 should read:
FIG. 9B provides a forward view of display screen logic Column 8, Line 17 should read:
FIG. 13A provides a detachment view of extension screen Column 8, Line 25 should read:
FIG. 13B provides an interior view of right hand side Column 13, Line 29 should read:
into a touch screen operational function; the slide track- In the Claims Column 14, Line 9 should read:
a logic board;